United States Patent
Pinto

(10) Patent No.: US 10,040,563 B1
(45) Date of Patent: Aug. 7, 2018

(54) DUAL PANEL ACTUATOR SYSTEM FOR JET ENGINES

(71) Applicant: Geoffrey P. Pinto, San Diego, CA (US)

(72) Inventor: Geoffrey P. Pinto, San Diego, CA (US)

(*) Notice: Subject to any disclaimer, the term of this patent is extended or adjusted under 35 U.S.C. 154(b) by 590 days.

(21) Appl. No.: 14/497,226

(22) Filed: Sep. 25, 2014

Related U.S. Application Data

(63) Continuation-in-part of application No. 14/251,316, filed on Apr. 11, 2014, now Pat. No. 9,581,109.

(60) Provisional application No. 61/811,071, filed on Apr. 11, 2013, provisional application No. 61/832,666, filed on Jun. 7, 2013.

(51) Int. Cl.
| | |
|---|---|
| *F02K 1/06* | (2006.01) |
| *F02K 1/08* | (2006.01) |
| *F02K 1/09* | (2006.01) |
| *B64D 29/06* | (2006.01) |
| *F02K 1/12* | (2006.01) |

(52) U.S. Cl.
CPC ............ *B64D 29/06* (2013.01); *F02K 1/09* (2013.01); *F02K 1/1261* (2013.01); *F02K 1/06* (2013.01); *F02K 1/12* (2013.01)

(58) Field of Classification Search
CPC ... F02K 1/06; F02K 1/08; F02K 1/085; F02K 1/09; F02K 1/11; F02K 1/12; F02K 1/54; F02K 1/56; F02K 1/60; F02K 1/62; F02K 1/64; F02K 1/70; F02K 1/72; F02K 1/74; F02K 1/76; B64D 29/06
See application file for complete search history.

(56) References Cited

U.S. PATENT DOCUMENTS

| | | | | |
|---|---|---|---|---|
| 2,523,842 A | * | 9/1950 | Oulianoff | B64D 33/04 239/265.19 |
| 2,680,948 A | * | 6/1954 | Greene | F02K 1/11 239/265.17 |
| 2,709,888 A | * | 6/1955 | Holl | F02K 1/06 138/45 |
| 2,761,277 A | * | 9/1956 | Holbrook | F02K 1/11 239/265.37 |
| 2,791,882 A | * | 5/1957 | Willard | F02K 1/1261 239/265.37 |

(Continued)

*Primary Examiner* — Lorne Meade
*Assistant Examiner* — Eric Linderman
(74) *Attorney, Agent, or Firm* — Charmasson, Buchaca & Leach, LLP

(57) ABSTRACT

An aircraft engine variable area fan nozzle structure disposed abaft a thrust reverser, including a sleeve translatable over a cascade array, comprises two semi cylindrical segments that can be axially translated and radially tilted to enlarge the fan duct exhaust area in order to optimize exhaust pressure and associated noise in high thrust circumstances such as on take-off, and to constrict that area under lower thrust conditions such as cruise. A pair of angularly adjacent segments can be moved by an actuator anchored to the fixed engine framework and independently of the thrust reverser translating sleeve. The tilting movement is imposed by the pivoting links of each segment to carriages that ride in a non-linear trackway secured to a thrust reverser translating sleeve. The actuator can be of a dual concentric type which can independently drive the trust reverser and nozzle segments.

27 Claims, 21 Drawing Sheets

(56) References Cited

U.S. PATENT DOCUMENTS

| | | | | |
|---|---|---|---|---|
| 2,800,766 A * | 7/1957 | Hemsworth | ............... | F02K 1/06 138/45 |
| 3,013,386 A * | 12/1961 | Meyer | ............... | F02K 1/60 239/265.19 |
| 3,041,829 A * | 7/1962 | Gelin | ............... | F02K 1/56 239/265.27 |
| 3,434,666 A * | 3/1969 | Shaw | ............... | F02K 1/60 239/265.19 |
| 3,550,855 A * | 12/1970 | Buell | ............... | F02K 1/60 239/265.29 |
| 3,579,991 A * | 5/1971 | Nelson, Jr. | ............... | F02K 1/60 60/229 |
| 3,601,340 A * | 8/1971 | Hilbig | ............... | F02K 1/60 239/265.17 |
| 3,604,662 A * | 9/1971 | Nelson, Jr. | ............... | F02K 1/60 239/265.29 |
| 3,610,534 A * | 10/1971 | Medawar | ............... | F02K 1/60 239/265.29 |
| 3,616,648 A * | 11/1971 | Weise | ............... | F02K 1/605 239/265.31 |
| 3,621,763 A * | 11/1971 | Geyer | ............... | F15B 11/22 244/110 B |
| 3,734,411 A * | 5/1973 | Wolf | ............... | B64C 9/32 239/265.29 |
| 3,815,357 A * | 6/1974 | Brennan | ............... | F02K 1/70 244/76 B |
| 3,856,239 A * | 12/1974 | Leibach | ............... | F02K 1/60 239/265.19 |
| 3,893,626 A * | 7/1975 | Leibach | ............... | F02K 1/563 239/265.19 |
| 4,093,122 A * | 6/1978 | Linderman | ............... | F02K 1/11 239/127.3 |
| 4,137,711 A * | 2/1979 | Montgomery | ............... | F02K 1/72 239/265.31 |
| 4,147,027 A * | 4/1979 | Greathouse | ............... | F02K 1/60 239/265.37 |
| 4,212,442 A * | 7/1980 | Fage | ............... | F02K 1/60 239/265.29 |
| 4,295,611 A * | 10/1981 | Wynosky | ............... | F02K 1/085 239/265.37 |
| 4,442,987 A * | 4/1984 | Legrand | ............... | B64D 29/08 239/265.25 |
| 4,462,207 A * | 7/1984 | Hitchcock | ............... | F02K 1/563 239/265.31 |
| 4,519,561 A * | 5/1985 | Timms | ............... | F02K 1/605 239/265.33 |
| 4,521,707 A * | 6/1985 | Baker | ............... | F16H 25/20 310/112 |
| 4,763,840 A * | 8/1988 | Madden | ............... | F02K 1/1223 239/265.35 |
| 4,805,840 A * | 2/1989 | Tape | ............... | B64C 25/423 239/265.35 |
| 4,909,442 A * | 3/1990 | Fernz | ............... | F02K 1/763 239/265.29 |
| 4,966,327 A * | 10/1990 | Fage | ............... | F02K 1/11 239/265.29 |
| 4,984,741 A * | 1/1991 | Nightingale | ............... | F02K 1/008 239/265.17 |
| 5,097,661 A * | 3/1992 | Lair | ............... | F02K 1/60 239/265.39 |
| 5,102,050 A * | 4/1992 | Sedziol | ............... | F02K 1/12 239/265.35 |
| 5,392,991 A * | 2/1995 | Gatti | ............... | F02K 1/11 239/265.29 |
| 5,476,237 A * | 12/1995 | Clarke | ............... | B32B 7/00 239/265.19 |
| 5,598,701 A * | 2/1997 | Newton | ............... | F02K 1/70 239/265.15 |
| 5,775,639 A * | 7/1998 | Fage | ............... | F02K 1/60 239/265.29 |
| 5,826,823 A * | 10/1998 | Lymons | ............... | B64D 33/04 239/265.29 |
| 5,956,939 A * | 9/1999 | Fage | ............... | F02K 1/06 239/265.19 |
| 6,167,694 B1 * | 1/2001 | Davies | ............... | F02K 1/763 60/226.2 |
| 6,474,059 B2 * | 11/2002 | Stretton | ............... | F02K 1/72 239/265.31 |
| 6,487,845 B1 * | 12/2002 | Modglin | ............... | F02K 1/60 239/265.29 |
| 6,487,846 B1 * | 12/2002 | Chakkera | ............... | F02K 1/766 239/265.27 |
| 6,845,945 B1 * | 1/2005 | Smith | ............... | B64D 33/04 239/265.19 |
| 6,968,675 B2 * | 11/2005 | Ramlaoui | ............... | F02K 1/72 60/226.1 |
| 7,174,704 B2 * | 2/2007 | Renggli | ............... | F02K 1/09 239/265.33 |
| 8,459,036 B2 * | 6/2013 | Baker | ............... | F02K 1/15 239/265.15 |
| 8,727,275 B2 * | 5/2014 | Aten | ............... | F02K 1/72 239/31 |
| 9,086,034 B2 * | 7/2015 | Aten | ............... | F02K 1/72 |
| 9,316,112 B2 * | 4/2016 | Scanlon | ............... | F01D 17/02 |
| 9,416,751 B2 * | 8/2016 | Jones | ............... | F02K 1/763 |
| 9,448,557 B2 * | 9/2016 | Maalioune | ............... | F02K 1/763 |
| 9,581,109 B1 * | 2/2017 | Pinto | ............... | F02K 1/72 |
| 9,695,778 B2 * | 7/2017 | Suciu | ............... | F02K 1/72 |
| 9,759,087 B2 * | 9/2017 | Amkraut | ............... | F01D 25/00 |
| 9,777,671 B2 * | 10/2017 | Ramlaoui | ............... | F02K 1/763 |
| 9,803,585 B1 * | 10/2017 | Pinto | ............... | F02K 1/1261 |
| 9,850,776 B2 * | 12/2017 | Hurlin | ............... | F01D 17/141 |
| 2002/0158146 A1 * | 10/2002 | Lair | ............... | B64C 15/02 239/265.19 |
| 2003/0019206 A1 * | 1/2003 | Johnson | ............... | F02K 1/72 60/204 |
| 2003/0159430 A1 * | 8/2003 | Lair | ............... | B64C 15/02 60/228 |
| 2003/0218094 A1 * | 11/2003 | Lair | ............... | B64D 33/04 244/110 B |
| 2005/0204742 A1 * | 9/2005 | Lair | ............... | F02K 1/06 60/770 |
| 2007/0294996 A1 * | 12/2007 | Stephan | ............... | F02K 1/64 60/226.2 |
| 2008/0072570 A1 * | 3/2008 | Lair | ............... | F02K 1/60 60/226.2 |
| 2008/0092548 A1 * | 4/2008 | Morford | ............... | F02K 1/06 60/771 |
| 2009/0013664 A1 * | 1/2009 | Jones | ............... | F02K 1/763 60/228 |
| 2009/0121078 A1 * | 5/2009 | Marche | ............... | B64C 29/06 244/110 B |
| 2009/0188233 A1 * | 7/2009 | Vauchel | ............... | F02K 1/09 60/226.2 |
| 2009/0259379 A1 * | 10/2009 | Hurwitz | ............... | F02K 1/002 701/100 |
| 2010/0064659 A1 * | 3/2010 | Wang | ............... | F02K 1/09 60/226.2 |
| 2010/0192715 A1 * | 8/2010 | Vauchel | ............... | F02K 1/763 74/89.35 |
| 2010/0205931 A1 * | 8/2010 | Baudu | ............... | F02K 1/72 60/226.2 |
| 2010/0218479 A1 * | 9/2010 | Moradell-Casellas | .... | F02K 1/72 60/226.2 |
| 2010/0326047 A1 * | 12/2010 | Gabel | ............... | F02K 1/72 60/226.2 |
| 2011/0050277 A1 * | 3/2011 | Maalioune | ............... | F01D 21/003 324/765.01 |
| 2011/0120081 A1 * | 5/2011 | Schwark, Jr. | ............... | F02K 1/09 60/226.3 |
| 2011/0277448 A1 * | 11/2011 | Roberts | ............... | B64D 29/06 60/226.2 |
| 2012/0137654 A1 * | 6/2012 | Burgess | ............... | F02K 1/06 60/204 |
| 2013/0160425 A1 * | 6/2013 | Scanlon | ............... | F01D 17/02 60/226.3 |
| 2013/0312387 A1 * | 11/2013 | West | ............... | F02K 1/09 60/226.2 |

(56) References Cited

U.S. PATENT DOCUMENTS

| | | | | |
|---|---|---|---|---|
| 2014/0000238 A1* | 1/2014 | Gonidec | .................... | F02K 1/09 60/226.2 |
| 2014/0027537 A1* | 1/2014 | Binks | ........................ | F02K 1/09 239/265.35 |
| 2014/0110503 A1* | 4/2014 | Teulou | .................... | B64D 33/04 239/265.19 |
| 2014/0150403 A1* | 6/2014 | Stuart | ........................ | F02K 1/72 60/204 |
| 2014/0239083 A1* | 8/2014 | Suciu | ........................ | F02K 1/62 239/11 |
| 2014/0353399 A1* | 12/2014 | Stuart | ........................ | F02K 1/72 239/11 |
| 2015/0121895 A1* | 5/2015 | Suciu | ........................ | F02K 1/72 60/796 |
| 2015/0345423 A1* | 12/2015 | Hurlin | ........................ | F02K 1/08 239/265.19 |
| 2016/0097346 A1* | 4/2016 | Rhoden | ....................... | F02K 1/18 60/204 |
| 2016/0131079 A1* | 5/2016 | Todorovic | ............. | F01D 17/105 239/265.19 |
| 2016/0131080 A1* | 5/2016 | Hue | ......................... | F02K 1/72 239/265.19 |
| 2016/0146113 A1* | 5/2016 | Zatorski | .................... | F02C 9/16 415/151 |
| 2016/0169158 A9* | 6/2016 | Ramlaoui | ................ | F02K 1/763 239/265.19 |
| 2016/0369745 A1* | 12/2016 | Mueller | ..................... | F02K 1/76 |
| 2017/0022935 A1* | 1/2017 | Corentin | .................... | F02K 1/60 |
| 2017/0292473 A1* | 10/2017 | Stretton | .................... | F02K 1/72 |

\* cited by examiner

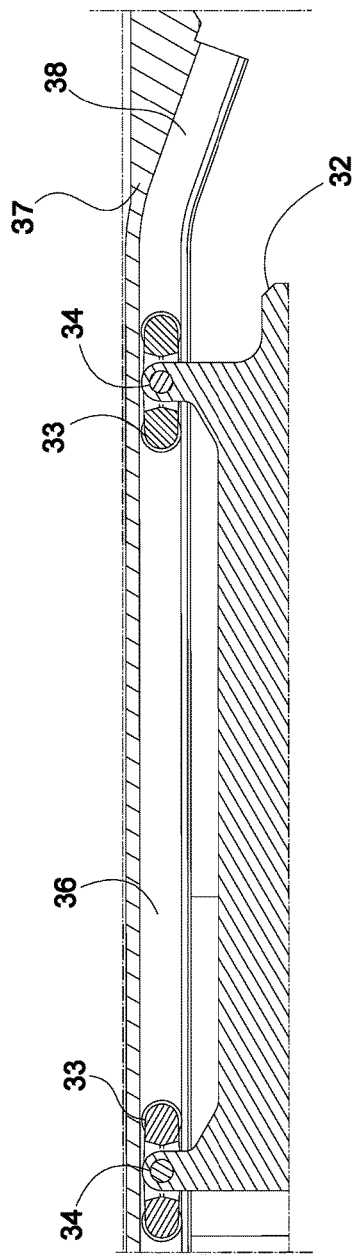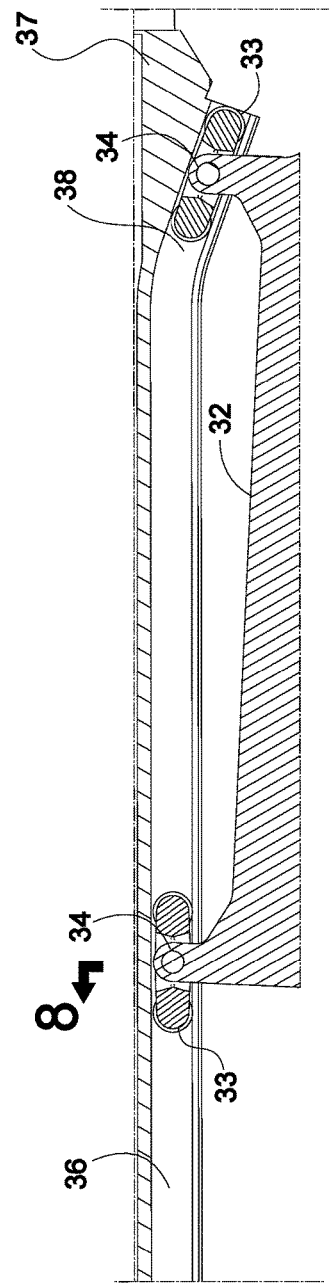

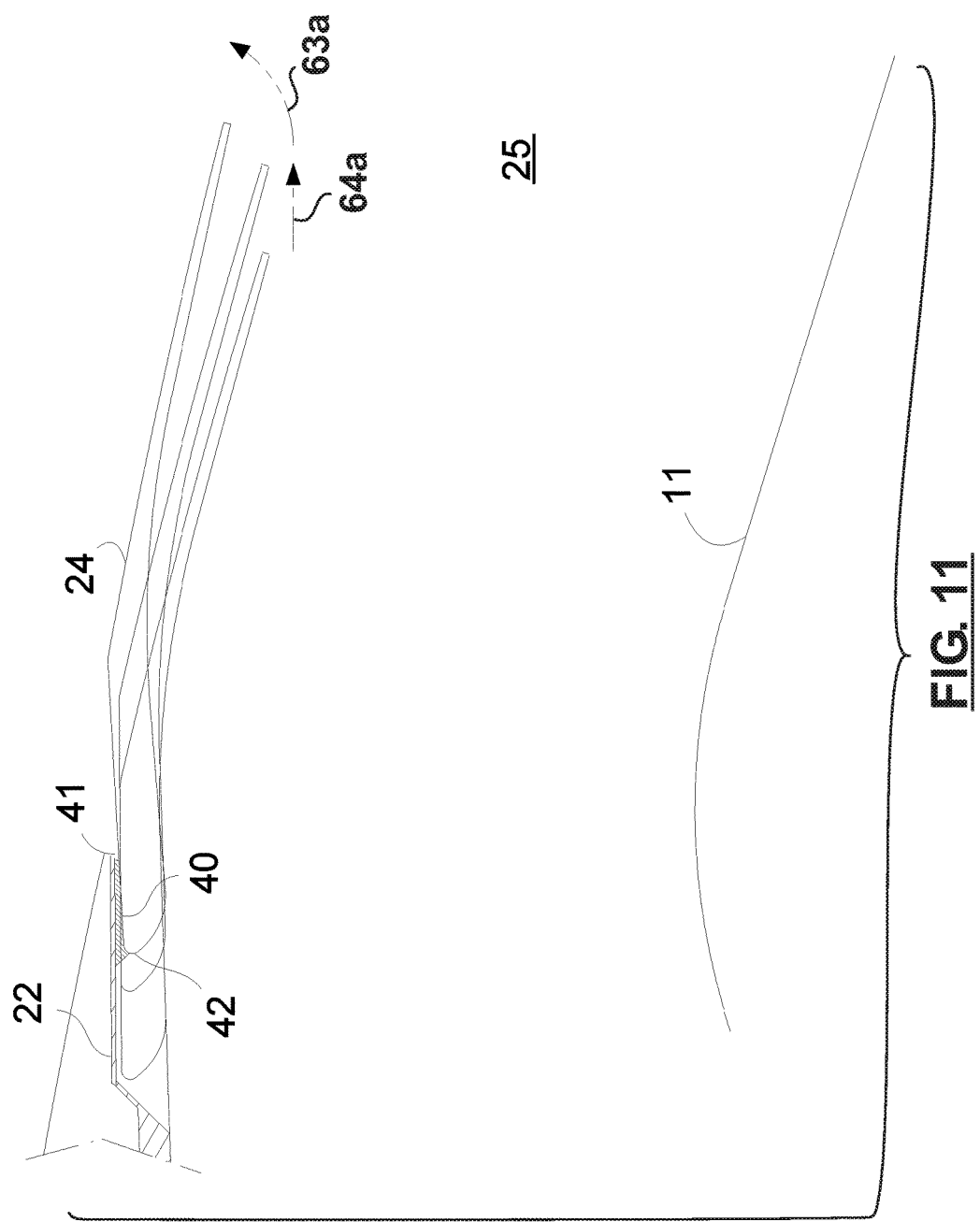

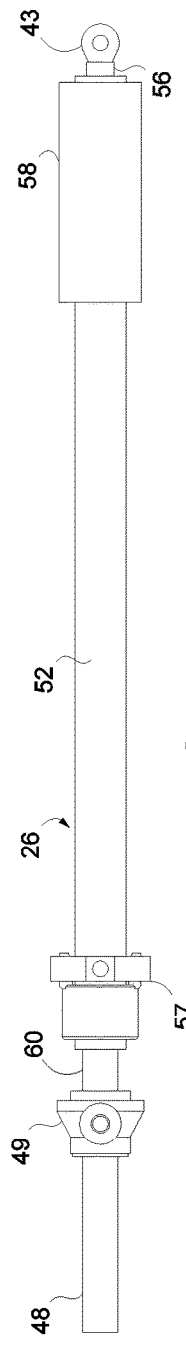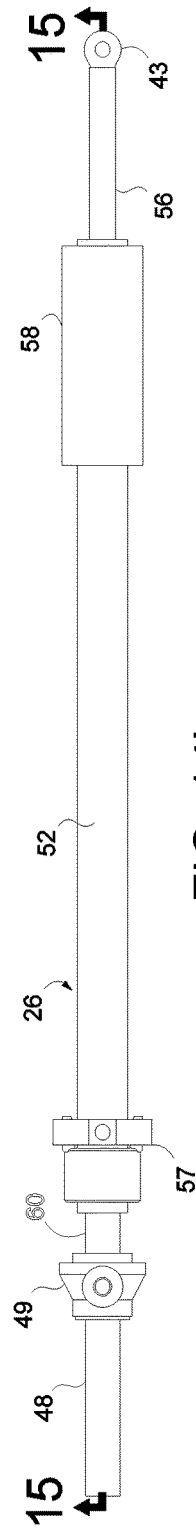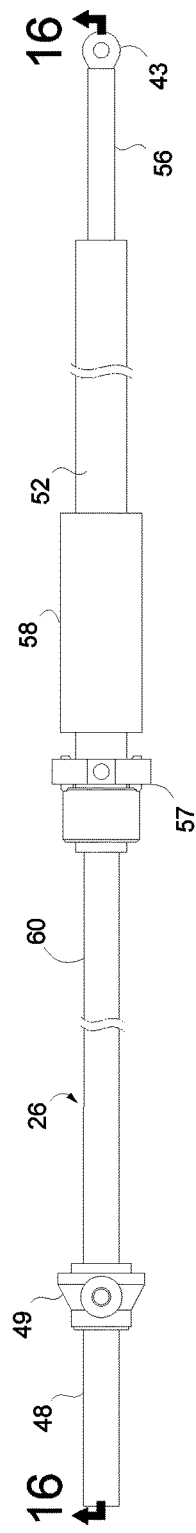

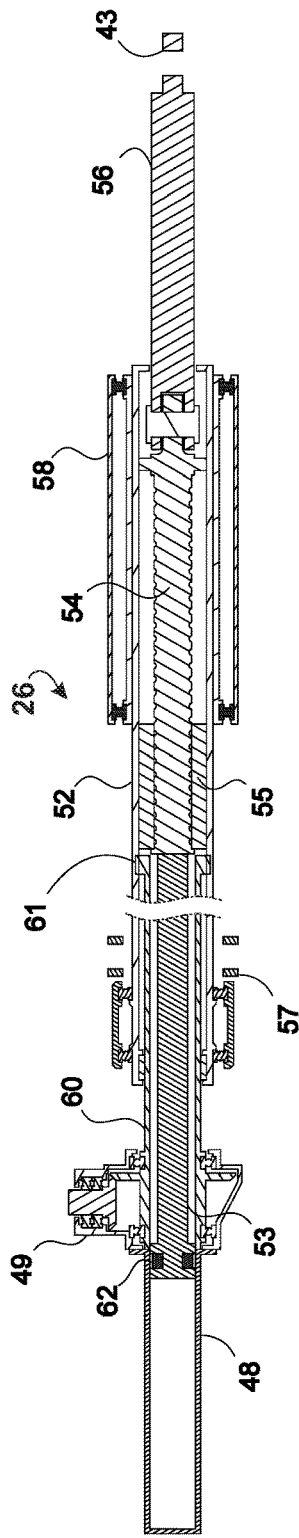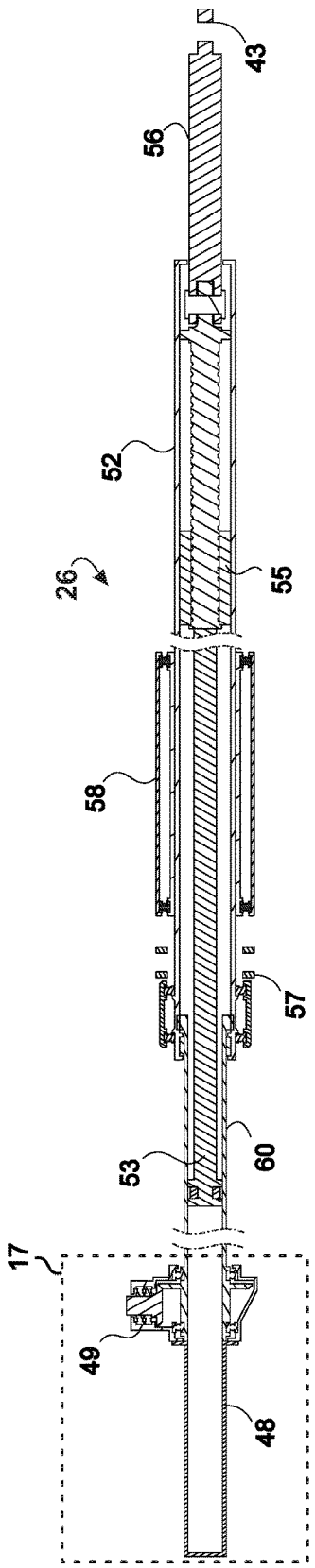

DUAL PANEL ACTUATOR SYSTEM FOR JET ENGINES

PRIOR APPLICATION

This application is a continuation-in-part of U.S. patent application Ser. No. 14/251,316, filed 2014 Apr. 11, which claims the benefit of U.S. Provisional Patent Application Ser. No. 61/811,071, filed 2013 Apr. 11, and U.S. Provisional Patent Application Ser. No. 61/832,666, filed 2013 Jun. 7, both of which are incorporated herein by reference.

FIELD OF THE INVENTION

The instant invention relates to gas turbine aircraft engines, and more particularly to systems for selectively controlling the fan duct bypass flow in order to optimize the engine performance and minimize noise under varying flight conditions.

BACKGROUND OF THE INVENTION

An aircraft gas turbine engine thrust reverser (T/R) functions to slow the forward speed of an aircraft either upon landing or during an aborted takeoff. The thrust reverser lessens wear to the landing gear brakes and allows for shorter runway length.

A translating sleeve style T/R features a sleeve structure that radially encapsulates a series of airflow vanes, commonly known as a cascade array, radially inward and outward with respect to the engine centerline. The trailing edge of the T/R on traditional embodiments forms the outer surface of the annular fan duct nozzle.

When the T/R is stowed the inner translating sleeve surface forms the outer wall of the engine fan duct and the outer surface forms part of the outer nacelle airflow surface.

When the T/R is deployed the sleeve structure translates aft while deploying blocking features into the fan duct. The blocking features, usually petal-style hinged panels, drop into the fan duct and force fan air radially through the cascade array which turns the flow outward and partially into the direction of aircraft travel thereby slowing forward motion.

A T/R generally comprises two semi-circular half segments, left and right, that operate in unison to generate reverse thrust.

On traditional engine designs the fan nozzle is fixed and generally designed to supply optimal efficiency at cruise speed and altitude. This creates engine noise and engine inefficiency during high thrust and low altitude operations.

In today's economic climate, fuel efficiency is of paramount importance and a need exists to customize an aircraft engine fan nozzle for all operational environments. Also, low aircraft noise is desirable as airline operations move away from large commercial hubs to smaller regional airports adjacent to population centers. Finally, dynamic pressures within the fan duct at high engine power can present a design challenge for aircraft engine designers. A Variable Area Fan Nozzle (VAFN) remedies these issues.

Current VAFN designs for practical use with translating sleeve thrust reversers introduce a new moving structure disposed on the trailing edge of the T/R that translates forward and aft in relation to the fan duct conical inner surface creating a variance in exit area. This structure can either be infinitely positionable between its two extremes or have discrete positions depending on functional requirements. As with the T/R, two semicircular VAFN half segments, left and right, operate in unison to create the complete fan duct exhaust nozzle.

As a translating VAFN forms the engine fan nozzle exit it must be located aft of the T/R translating sleeve. Also, in order to avoid interference when the T/R deploys the VAFN must also have a capability to move either in unison with or out of the way of the T/R translating sleeve for a plurality of positions between close and open. Also, as shown in U.S. Publication No. 20090053058 Kohlenberg et al., movement of the VAFN structure can open and close a bypass port for adjusting airflow.

Prior art VAFN designs have located actuation components on the T/R translating sleeve as disclosed in U.S Publication No. 2010/0229528 Ramlaoui et al. incorporated herein by reference in this specification. The sleeve is generally a relatively soft structure which slides on loose tracks and thus presents a high vibration environment. These designs also require many degrees of freedom in order to prevent binding of the actuator which is attached to the fixed engine structure, translating sleeve and VAFN. This adds unnecessary complexity and weight while reducing reliability and maintainability.

These prior art designs have only been able to sense nozzle position across the full VAFN stroke by using a dedicated position sensing system connected between the nozzle and the fixed structure where the control system is located, thus incurring a high weight penalty.

Thus prior art actuators, such as in Ramlaoui et al., have used multiple components in order to transmit motive force developed on the fixed T/R structure to the T/R translating sleeve and finally to the VAFN. This increases weight and makes for poor maintainability and higher complexity resulting in lower reliability.

Due to the layout of those actuation designs, large components can be located at the back of the driveline forcing the need for exaggerated aerodynamic fairings to house the actuation system. This increases both weight and aircraft drag.

Other VAFN embodiments of the prior art feature a plurality of sliding trackways disposed radially on a conic surface as disclosed in U.S. Pat. No. 8,127,531 Parham. This arrangement creates a bind rather than a free functioning system as the guides disposed circumferentially on the conic surface are not parallel to one another.

There have been attempts to integrate the VAFN and thrust reverser actuators into one unit as taught in French Patent Publication No. 2,922,059 Vauchel et al., and US Publication No. 2012/0137654 Burgess among others. This requires redundancy in components to isolate one system from the other in order to prevent a common mode, dual system failure. This yields no weight savings compared to separate actuation systems. Separate VAFN and T/R actuators allow for aircraft dispatch with one system failed while retaining the function of the other. This reduces maintenance time and cost because actuator replacement only requires one system to be repaired while the other remains unaffected. Also, this approach requires transmission of power from the fixed part of the T/R structure to the translating sleeve, then to the VAFN which requires more degrees of freedom resulting in increased weight.

Previous designs have attempted to pivot the entire thrust reverser translating sleeve in order to vary exit area as disclosed in U.S. Pat. No. 8,127,532 Howe incorporated herein by reference in this specification. This results in a significant weight penalty by introducing an intermediate pivoting structure between the thrust reverser translating sleeve and fixed nacelle structure.

The instant invention results for efforts to address one or more of the above identified problems.

SUMMARY OF THE INVENTION

The principal and secondary objects of the invention are to provide an improved jet engine. These and other objects are achieved by a VAFN nozzle that can both translate and tilt about shifting axes in order to increase nozzle exhaust area using a relatively short actuator stroke.

In some embodiments the nozzle is made of two half-frusto-conical segments, each rockingly linked to a pair of spaced-apart carriages rolling along a non-linear trackway which imposes a tilting movement to the segment as the carriages shift axially when reaching an outwardly bent section of the trackway.

In some embodiments the actuators are anchored to two components of the nacelle stationary structure, namely the torque box girder and longitudinal beams. In some embodiments these actuators effect both the axial translation of the segments and their tilting movement.

In some embodiments the actuator is a single unit and is easily replaceable.

In some embodiments, attaching the actuators to the fixed nacelle structure eliminates the increased component sizing needed to survive vibration on the thrust reverser translating sleeve.

In some embodiments the combination of the actuator and position sensor in one integrated unit allows for reduced fairing size due to the minimized design of aft end configuration, and forgoing the need for supplemental sensing systems.

In some embodiments the VAFN nozzle structure's ability to tilt as well as translate reduces actuator weight and fairing size by allowing for shorter actuator stroke required to obtain comparable nozzle exit area with a purely translating design.

In some embodiments the translating/tilting concept allows the trackway to be customized to allow for the specifics of each nacelle shape and performance envelope.

In some embodiments, the trackway guide profile may be of any shape even allowing for the forward portion of the nozzle to travel radially inward in relation to engine centerline in order to improve T/R sleeve clearance while the aft portion is rotating radially outward.

In some embodiments the design transmits torque from fixed structure directly to the VAFN nozzle and is simply axially slaved to the thrust reverser translating sleeve.

In some embodiments the integrated full-stroke sensing in the actuator precludes the need for another dedicated VAFN position sensing system.

In some embodiments the VAFN position sensing system operates in absence of a VAFN position sensor not integrated with the actuator.

In some embodiments due to the actuator aft VAFN attach configuration, mating VAFN attach structure may be smaller than on previous designs.

In some embodiments compared with "pivoting beam" designs no intermediate pivoting beam structure is require to make the nozzle tilt radially outward from the engine centerline.

In some embodiments the actuation system works with all three known VAFN configurations, that is, ported, non-ported, and sleeved as commonly characterized in the art.

In some embodiments it is provided that in an aircraft gas turbine nacelle assembly having a fore-and-aft central axis, a stationary structure, including an annular torque box girder, at least two longitudinal beams and a transversal crosstie ring, said assembly further including a thrust reverser cascade array between said girder and said ring, a movable sleeve having axial sliders shaped and dimensioned to translate said sleeve across and close said array, and a plurality of movable fan nozzle segments abaft said sleeve, an improvement which comprises: at least one of said segments being slidingly and rockingly connected to at least two of said sliders, whereby said nozzle can be axially translated and radially varied; and wherein said sleeve and said one of said segments are axially translated by first and second actuators both anchored to said stationary structure.

In some embodiments the improvement further comprises: a guiding trackway secured along one of said axial sliders; a carriage riding on said trackway; and, said segment being rotatively connected to said carriage.

In some embodiments the segment is rotatively connected to said carriage about at least one axis substantively normal to said central axis.

In some embodiments the trackway is attached to said sleeve.

In some embodiments the first actuator comprises a body anchored to said girder and an extensible arm connected to said sleeve; and, said second actuator has a body anchored to said girder and an extensible arm connected to said segment.

In some embodiments the trackway has an outwardly curving section.

In some embodiments the section is bent to induce said segment into a tilting movement in reference to one of said sliders.

In some embodiments the improvement further comprises a position sensor integrated within said second actuator.

In some embodiments the second actuator comprises a ballscrew and ballnut coupling.

In some embodiments the position sensor comprises a linear variable differential transformer.

In some embodiments said first and second actuators are coaxially mounted in an assembly anchored to said stationary structure.

In some embodiments said assembly is fixedly attached to said girder and to one of said beams.

In some embodiments said assembly is attached to said girder and to one of said beams by one or more components which allow supplemental degrees of freedom to accommodate structural deflections.

In some embodiments said assembly comprises: a translatable first ballnut attached to said sleeve; and a non-translatable tubular first ballscrew engaging said first ballnut.

In some embodiments said assembly further comprises: a translatable second ballnut; a torque tube coaxially mounted within said first ballscew and secured to said second ballnut; and a translatable second ballscrew engaging said second ballnut and having a distal end attached to said segment.

In some embodiments said assembly further comprises a gear box including: a rotatable input shaft; a first output shaft rotatively driving said first ballscrew; and a second output shaft rotatively driving said torque tube via an intermediate output shaft.

In some embodiments said gearbox comprises: a clutch mechanism and a rotation reverser mechanism between said input shaft and each of said output shafts.

In some embodiments said assembly further comprises: a slide tube coaxially surrounding said first ballscrew; and, a bearing attached to one of said beams and slidingly supporting said slide tube.

In some embodiments said assembly further comprises: an arm extending axially from said second ballscrew distally outside said bearing; and a bracket connecting said arm to said segment.

In some embodiments there is provided an aircraft gas turbine nacelle assembly having a fore-and-aft central axis and comprising: a stationary structure including an annular torque box girder, a transversal crosstie ring and at least two longitudinal beams; a thrust reverser cascade array between said girder and said ring; a movable sleeve having at least two lateral sliders shaped and dimensioned to carry said sleeve axially across and close said array; a plurality of movable fan nozzle segments abaft said sleeve; each of said segments being slidingly and tiltingly connected to at least one of said sliders by an assembly including: a non-linear trackway; at least two spaced apart carriages riding in said trackway; and, each of said carriages comprising a pivoting link to said segment.

In some embodiments the trackway includes a section bent radially and outwardly.

In some embodiments the assembly further comprises at least one pair of segment actuators for each of said segments, said at least one pair of segment actuators being anchored at one end to said stationary structure, and at an opposite end to one of said segments.

In some embodiments at least one of said at least one pair of segment actuators comprises: a linkage to said sleeve, said linkage having sufficient degrees of freedom and clearance to allow relative motion between said at least one of said at least one pair of segment actuators and said sleeve.

In some embodiments at least one of said at least one pair of segment actuators comprises a segment position sensor.

In some embodiments said sensor comprises a linear variable differential transformer integral with said at least one of said at least one pair of segment actuators.

In some embodiments the assembly further comprises: at least one sleeve actuator anchored at one extremity to said girder and at an opposite extremity to said sleeve; whereby said sleeve can be actuated independently from said segment.

In some embodiments at least one of said at least one pair of segment actuators further comprises: a jackscrew extender having an axially translatable shaft and a linkage between said shaft and said segment; whereby said segment can be axially translated along with said sleeve.

In some embodiments at least one of said at least one pair of segment actuators comprises an attachment to one of said beams.

In some embodiments said assembly further comprises a gimbaled link between said sleeve and a first one of said at least one pair of segment actuators.

In some embodiments it is provided that in an aircraft gas turbine nacelle assembly having a fore-and-aft central axis, a stationary structure, including an annular torque box girder, at least two longitudinal beams and a transversal crosstie ring, said assembly further including a thrust reverser cascade array between said girder and said ring, a movable sleeve having axial sliders shaped and dimensioned to translate said sleeve across and close said array, and a plurality of movable fan nozzle segments abaft said sleeve, an improvement which comprises: an angularly adjacent pair of movable fan nozzle segments abaft said crosstie ring; wherein said pair are slidingly and tiltingly driven with respect to said stationary structure by at least one actuator; and, said at least one actuator being mechanically linked to a first one of said pair of segments by a first linking structure; and said at least one actuator being mechanically linked to a second one of said pair of segments by a second linking structure.

In some embodiments said first linking structure comprises: a first non-linear guiding trackway; and, at least two spaced apart carriages riding in said trackway.

In some embodiments said first one of said pair of segments is rotatively connected to each of said carriage about at least one axis substantially normal to said central axis.

In some embodiments said trackway is attached to said sleeve.

In some embodiments said at least one actuator comprises a body anchored to said girder and an extensible arm connected to said sleeve.

In some embodiments said trackway has an outwardly curving section.

In some embodiments said section is bent to induce said first one of said pair of segments into a tilting movement in reference to said trackway.

In some embodiments a flow adjusting port is created between a leading edge of at least one of said segments and said sleeve when said at least one of said segments is driven to an aft position.

In some embodiments said flow adjusting port is selected from the group consisting of a bypass port and an ejector port.

In some embodiments the improvement further comprises a position sensor integrated within said at least one actuator.

In some embodiments said at least one actuator comprises a ballscrew and ballnut coupling.

In some embodiments said position sensor comprises a linear variable differential transformer.

In some embodiments said at least one actuator comprises coaxially mounted components in an actuation assembly anchored to said stationary structure.

In some embodiments said actuation assembly is fixedly attached to said girder and to one of said beams.

In some embodiments said actuation assembly comprises: a translatable first ballnut attached to said sleeve; and, a non-translatable tubular first ballscrew engaging said first ballnut.

In some embodiments said actuation assembly further comprises: a translatable second ballnut; a torque tube coaxially mounted within said first ballscrew and secured to said second ballnut; and a translatable second ballscrew engaging said second ballnut and having a distal end attached to said first one of said pair of segments.

In some embodiments the improvement further comprises a gear box including: a rotatable input shaft; a first output shaft rotatively driving said first ballscrew; and, a second output shaft rotatively driving said torque tube.

In some embodiments said gear box comprises: a clutch mechanism and a rotation reverser mechanism between said input shaft and each of said output shafts.

In some embodiments said actuation assembly further comprises: a slide tube coaxially surrounding said first ballscrew; and, a bearing attached to one of said beams and slidingly supporting said slide tube.

In some embodiments said actuation assembly further comprises: an arm extending axially from said second ballscrew distally outside said bearing; and, a bracket connecting said arm to said first one of said pair of segments.

In some embodiments there is provided an aircraft gas turbine nacelle assembly having a fore-and-aft central axis and comprising: a stationary structure including an annular torque box girder, a transversal crosstie ring and at least two longitudinal beams; a plurality of movable fan nozzle segments abaft said crosstie ring; wherein an adjacent pair of said segments are slidingly and tiltingly driven with respect to said stationary structure by at least one actuator; and, said at least one actuator being mechanically linked to a first one of said pair of segments by a first linking structure; and said at least one actuator being mechanically linked to a second one of said pair of segments by a second linking structure.

In some embodiments the assembly further comprises: said first linking structure comprising: a first non-linear guiding trackway; and, at least two spaced apart carriages riding in said trackway.

In some embodiments a flow adjusting port is created between a leading edge of at least one of said segments and said stationary structure when said at least one of said segments is driven to an aft position.

In some embodiments said flow adjusting port is selected from the group consisting of a bypass port and an ejector port.

In some embodiments said trackway includes a section bent radially and outwardly.

In some embodiments said at least one actuator comprises: a linkage to said sleeve, said linkage having sufficient degrees of freedom and clearance to allow relative motion between said at least one actuator and said sleeve.

In some embodiments said at least one actuator comprises a segment position sensor.

In some embodiments said sensor comprises a linear variable differential transformer integral with said at least one actuator.

In some embodiments said at least one actuator is a dual actuator which comprises: a first extremity anchored to said girder and a second extremity anchored to said sleeve; whereby said sleeve can be actuated independently from said pair of segments.

In some embodiments said dual actuator further comprises: a jackscrew extender having an axially translatable shaft and a linkage between said shaft and said segments; whereby said segments can be axially translated along with said sleeve.

In some embodiments said at least one actuator comprises an attachment to one of said beams.

In some embodiments the assembly further comprises a gimbaled link between said sleeve and said at least one actuator.

The content of the original claims is incorporated herein by reference as summarizing features in one or more exemplary embodiments.

BRIEF DESCRIPTION OF DRAWINGS

FIG. 4 is a cross-sectional view of a carriage to trackway attachment in the un-translated and un-tilted position of the VAFN segment.

FIG. 5 is a similar view in the translated and tilted position.

FIG. 11 is a diagrammatical view taken along line 11-11 of FIG. 1 of the movement of a VAFN segment.

FIG. 14a is a side view of a segment actuator in a withdrawn position.

FIG. 14b is a view thereof in a partial (VAFN only) extended position.

FIG. 14c is a view thereof in the fully (VAFN and T/R sleeve) extended position.

FIG. 15 is a cross-sectional view taken along line 15-15 of FIG. 14b when the VAFN segment is fully open and tilted and the T/R closed.

FIG. 16 is a cross-sectional view taken along line 16-16 of FIG. 14c when the VAFN segment is fully open and tilted, and the T/R open.

DETAILED DESCRIPTION

Figure 1:
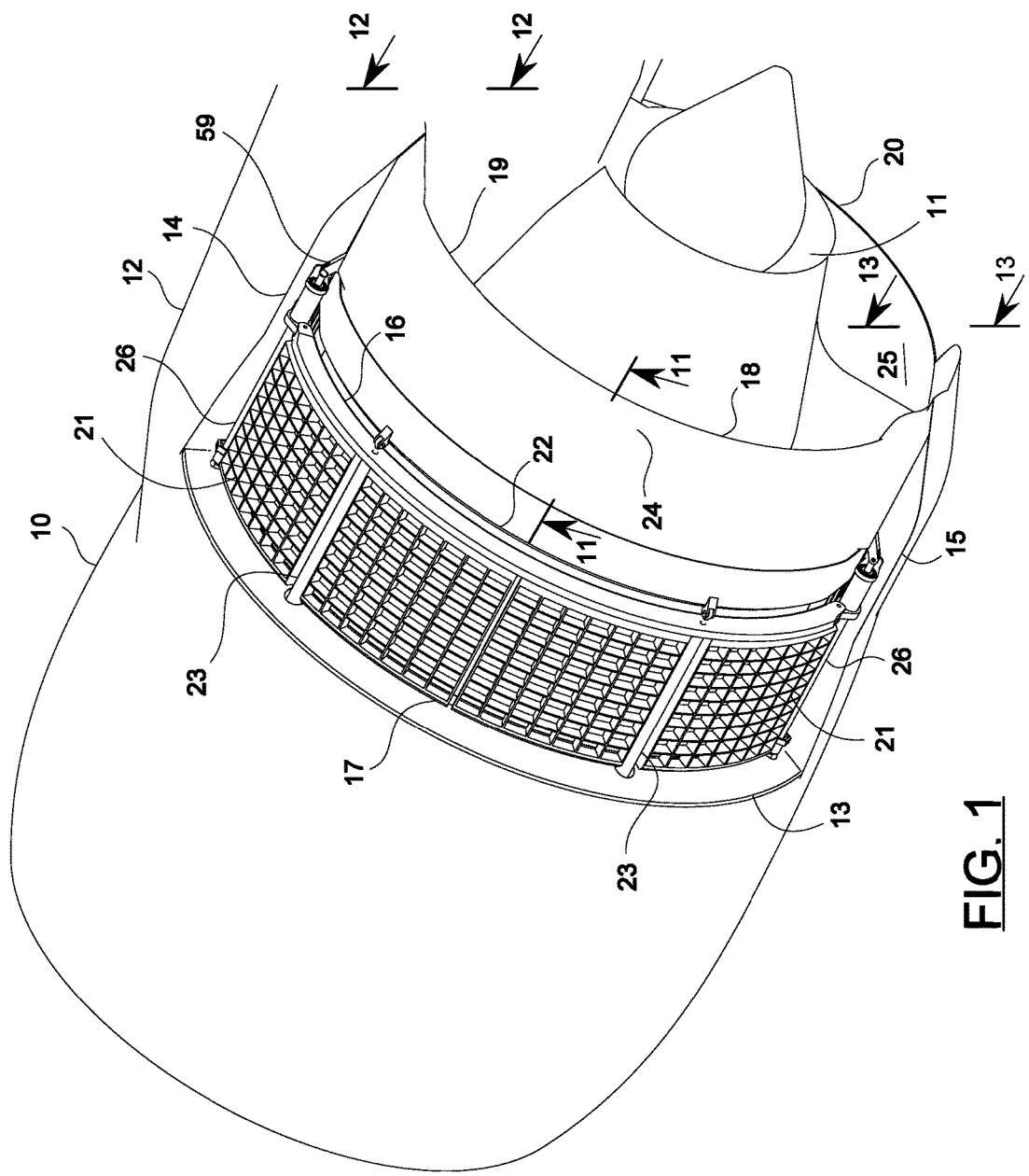
FIG. 1 is a perspective view of a nacelle housing an aircraft gas turbine engine.

Referring now to the drawing, there is shown in FIG. 1 the nacelle 10 of an aircraft gas turbine engine 11 supported by a pylon 12 integrating a trust reverser (T/R) 17 including a stationary frame including an annular torque box girder 13, fore-to-aft upper beam 14 and lower beam 15 and a transversal crosstie ring 16. Between the girder and the ring, the T/R further includes a cascade array 21. A semi-circular translatable sleeve 22 enshrouds the cascade array radially inwardly and outwardly. The sleeve can be shifted aftward by actuators 23 to open the T/R. Abaft of the sleeve is a variable area fan nozzle (VAFN) 18 divided into a left half portion 19 and a right half portion 20 by the upper and lower beams. Each half portion has a frusto-conical segment 24 that can be axially translated and tilted to increase or decrease the fan exhaust area 25 by actuators 26.

It should be noted that both sets of actuators 23, 26 are anchored on components of a stationary structure, namely the torque box girder 13, and one actuator 26 is also anchored to a longitudinal beam. Each one of the segment actuators 26 incorporates a position sensor 27 as will be further described below.

Figure 2:
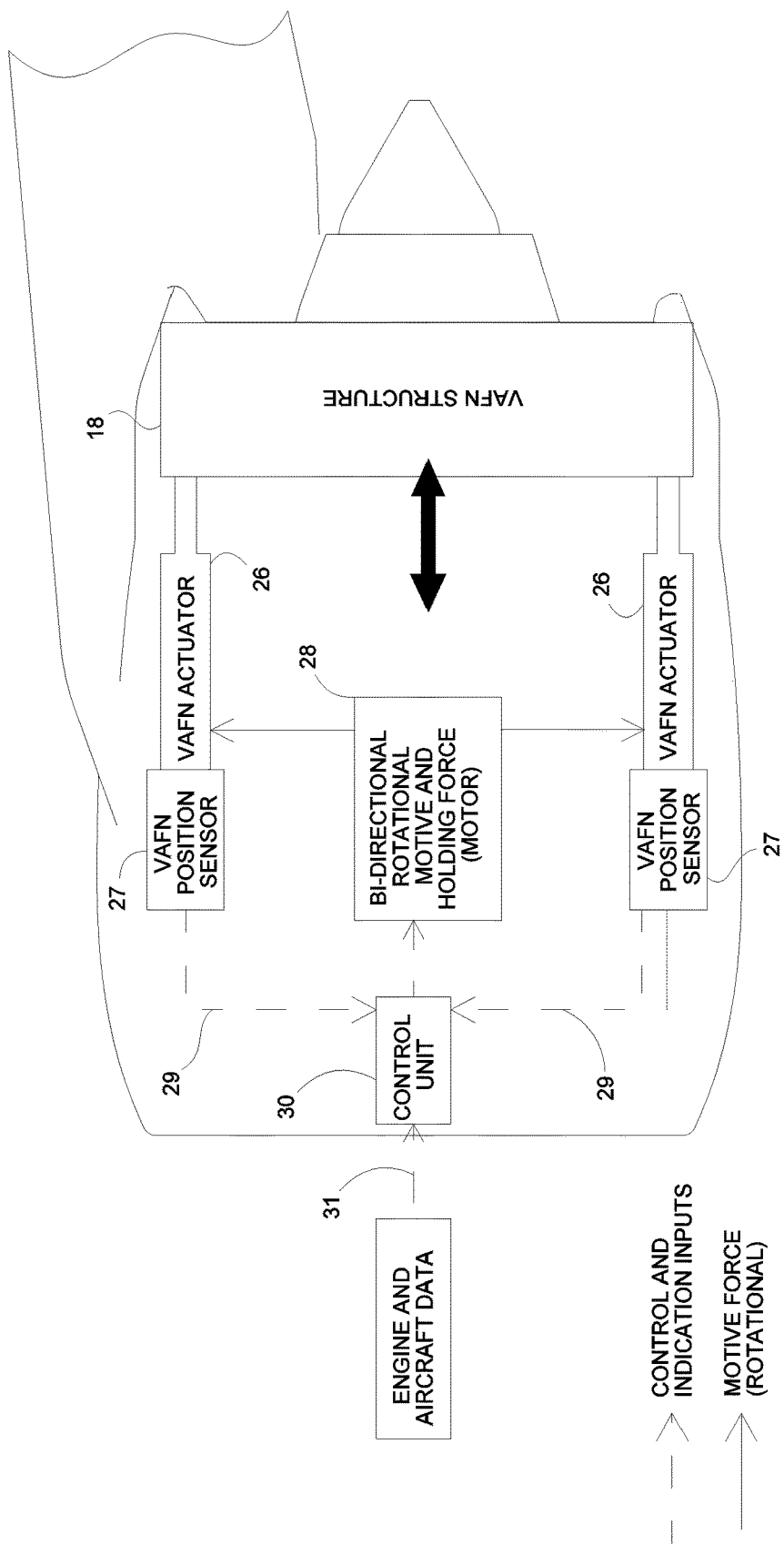
FIG. 2 is a schematic of the VAFN control and actuation system.

The schematic of FIG. 2, illustrates the control elements of one half portion 19 in the preferred two VAFN actuator configuration.

The control system described below is intended to control both segment half portions 19, 20 simultaneously and synchronously. A motor 28 drives both VAFN portions 19,20. In practice the control system can either control one motor with splitting outputs to a plurality of actuators acting on both VAFN half portions, or the control system can send signals to a plurality of motors which are coordinated to move both VAFN halves in unison. The outputs 29 of the sensors are fed to a control unit 30 which can be integral with the engine controller which also receives engine and aircraft data 31, and generates control signals 32 for the motor that in turn drives the actuators. The placement of the actuators 26 adjacent to T/R fixed upper and lower beams 15, 16 allows actuators to be located within the upper and lower T/R slider track fairings. This in turn results in negligible enlargement of aforementioned fairings depending on nacelle shape.

Figure 3:
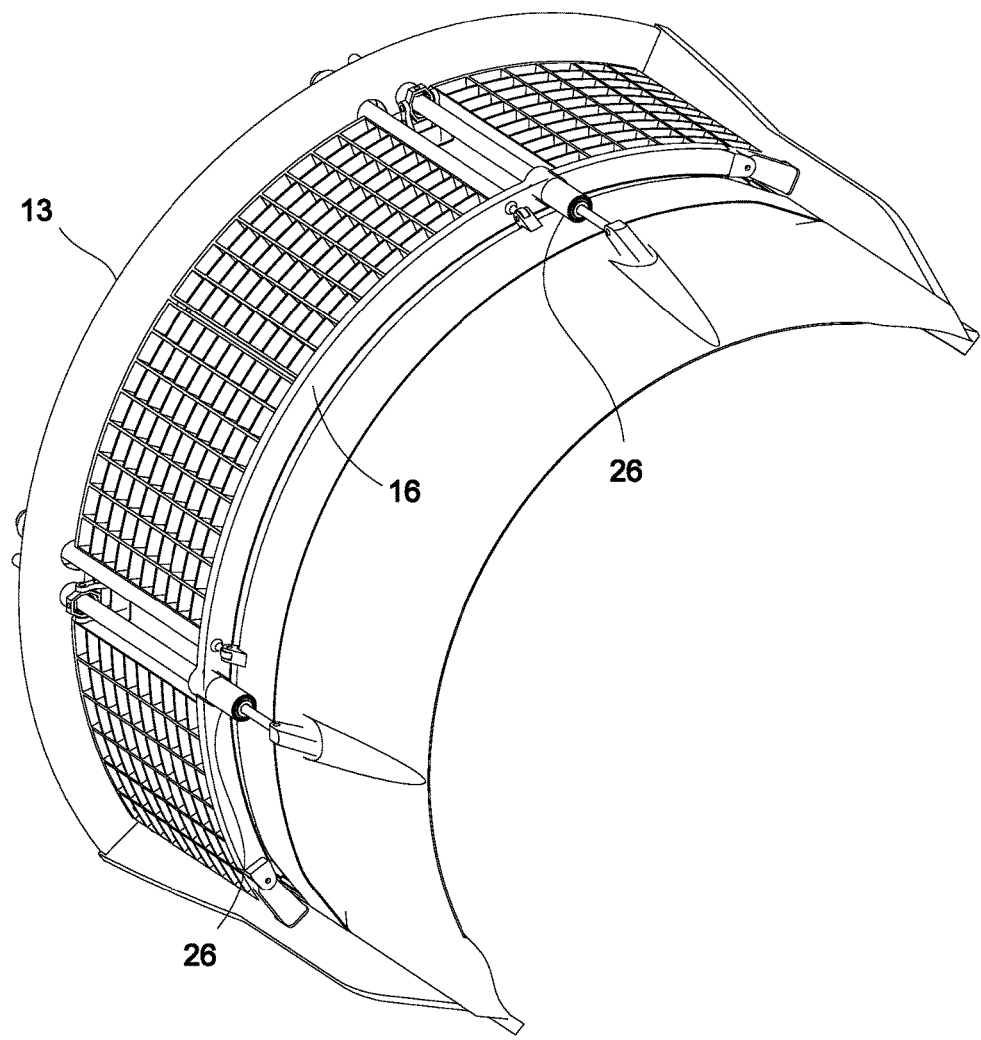
FIG. 3 is a perspective view of a left portion of a VAFN.

An alternate configuration illustrated in FIG. 3, positions two VAFN actuators in the midspan area equally spaced circumferentially about the VAFN segment centerplane and attached to both the girder 13 and the transversal crosstie ring 16. This allows the actuators to apply load to the VAFN close to the VAFN center of pressure. Also, in this configuration the segment actuators may be co-located with the T/R sleeve actuators 23 and reduces the amount of interruption to the cascade array 21. This also has a benefit of allowing common access panels (not shown) for the T/R sleeve mechanism and for the VAFN mechanism as well, reducing overall weight. As compared with prior art actuation systems, the fairing size required to house actuators away from the longitudinal beams is relatively small.

It should be noted that in FIG. 1, the VAFN portions are shown in their withdrawn, that is closed, minimum exhaust area position; while in FIG. 3 the segment 24 is fully deployed, that is in an open, maximum exhaust position effected by a relatively short stroke of the actuators 26.

A second alternate configuration (not illustrated) employs three actuators with two actuators located as per the above configuration and a third actuator evenly spaced circumferentially between the two at the VAFN segment midspan. This is beneficial on large aircraft engines where the large VAFN segment panel may be relatively soft. As compared with prior art designs, the fairing size required to house the actuator in a midspan mount configuration is relatively small.

As illustrated in FIGS. 4-8, each circumferential edge 32 of the VAFN segment can be rotatively connected to a pair of spaced-apart double-roller carriages 33 by pins 34. The rollers 35 of the carriages are captured by and run along a trackway 36 which can be attached to one of the T/R sliders 37.

Figure 7:
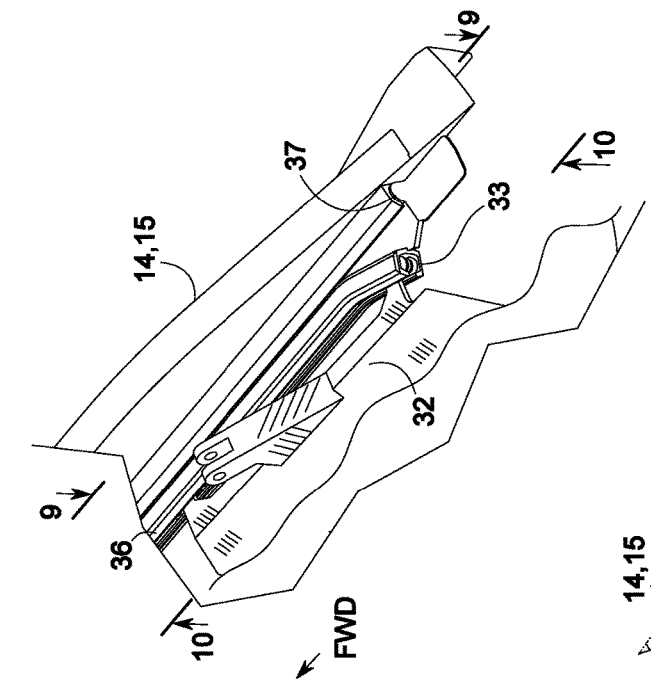
FIG. 7 is a similar view in the translated and tilted position.
Figure 8:
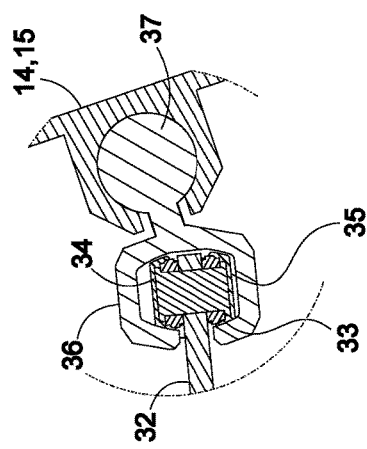
FIG. 8 is a cross-sectional view taken along line 8-8 of FIG. 5 and FIG. 6.
Figure 6:
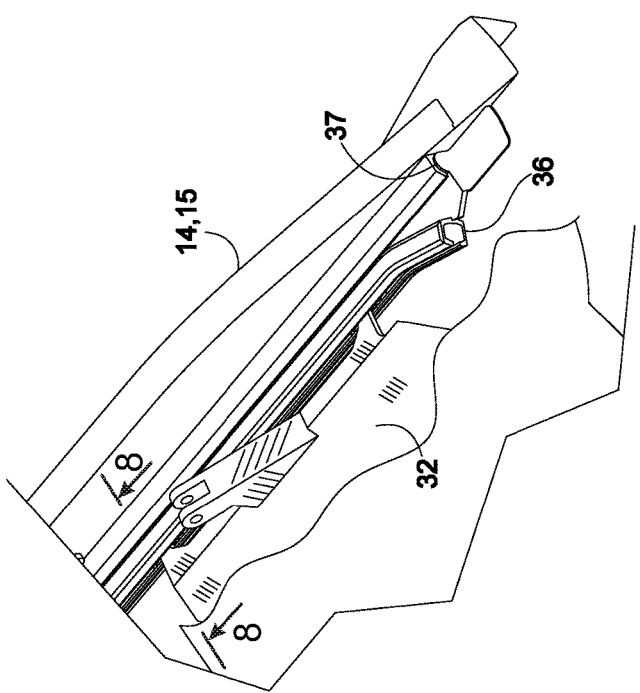
FIG. 6 is a perspective partial view of the carriage to trackway attachment in the un-translated and un-tilted position of the VAFN segment.

The trackway follows a non-linear path substantially located within the plane of the axial edge 32 of the VAFN segment. More specifically, the trackway has an outwardly bent trailing portion 38 that, when the segment approaches its most extended position, as illustrated in FIG. 7, causes the most rearwardly positioned carriage to force the rear of the segment to tilt radially outward and broaden the exhaust area 25.

The upper and lower trackways 36 are disposed parallel to one another about the horizontal midplane of the VAFN segment structure. The upper and lower pins 34 are coaxial at both forward and aft locations. Their pivot axes are normal to the trackway center planes. The trackways may be lined with a sacrificial material (not shown). Their cross section may accommodate crowned rollers to allow for roller/track self-alignment and VAFN segment flex. The trackway path may be customized to engine requirements. The trackway 36 may be designed in such a way that the forward roller link translates inward to improve the T/R sleeve clearance or allow the VAFN segment to pivot outward at an earlier stroke extension or both. Further, the trackway path can be customized to suit nozzle area versus stroke requirements.

Each roller linkage features rollers that can contact either the inboard or outboard side of the trackway in order to accommodate reversing structural loads. Attachments of the roller linkage to VAFN may be of a failsafe or waiting failsafe design. The roller attachment to roller linkages can be designed in such a way that a failure to one roller lug or roller pin will not cause the carriage to become disengaged from the trackway. There can be means (not shown) to prevent the rollers from wedging down into the trackway when the VAFN structure is not loaded against the inboard or outboard trackway surfaces such as when the engine is not operating. This may be accomplished by a protrusion in the roller pin or a boss at the bottom of the trackway or both or some other equivalent means.

Figure 9:
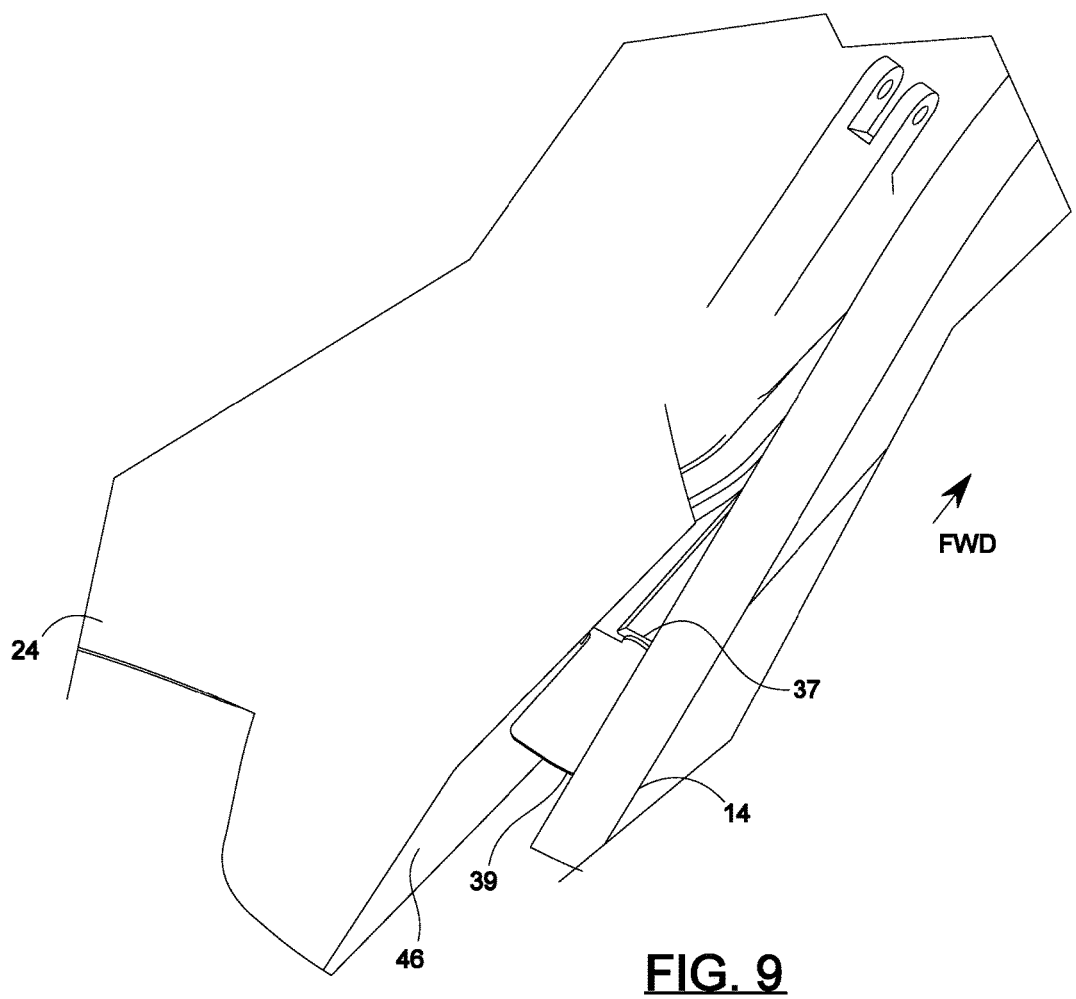
FIG. 9 is partial inside perspective view taken along line 9-9 of FIG. 7 of the fan duct flow blocker assembly from the outside of the fan duct.
Figure 10:
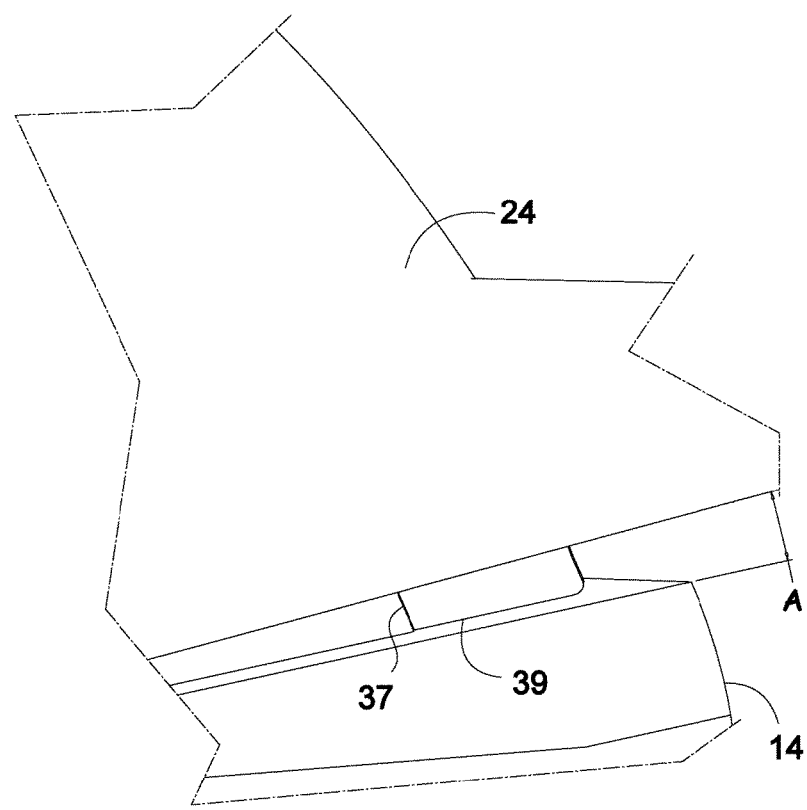
FIG. 10 is a similar inside view taken along line 10-10 of FIG. 7 of the fan duct flow blocker assembly.

As shown in FIGS. 9 and 10, the angle of tilt A is usually in the range of several degrees. The gap between the beam 14, 15 and the VAFN segment 24 in the tilted position is covered by a blocker plate extension 39 of the sleeve in order to prevent premature duct leakage upstream of the nozzle exit plane.

Recesses 46 in VAFN segments allow for structural features on thrust reverser translating sleeve to prevent fan duct leakage upstream of the nozzle exit plane. In practice, flow blockers 39 as shown in FIGS. 9 and 10, and/or seals shall accompany these structures in order to minimize fan duct airflow losses.

The enlarging of the fan exhaust area 25 can be varied by adjusting the tilting movement 63*a* and/or translating movement 64*a* of the segment 24 relative to the conical fixed structure 11 as illustrated in the diagram of FIG. 11. A compressible seal 40 between the rear transversal edge 41 of the sleeve and the leading edge 42 of the segment prevents any premature escape of the fan duct airflow.

It should be understood that the VAFN structure may be of any of the currently known configurations: ported, non-ported or sleeved. In the case of non-ported or sleeved VAFN configurations, the seal 40 shall accommodate the marginally-increased gap developed when the VAFN segments are tilted.

Figure 13:
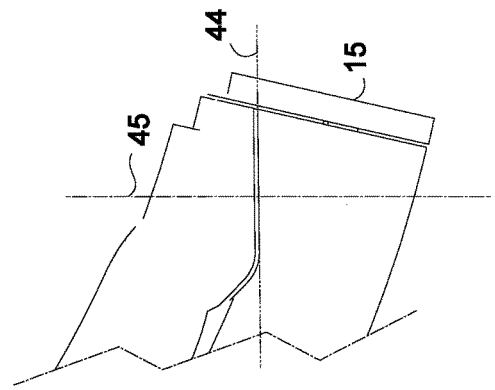
FIG. 13 is a diametrical view taken along line 13-13 of FIG. 1 of the lower fairing split.
Figure 12:
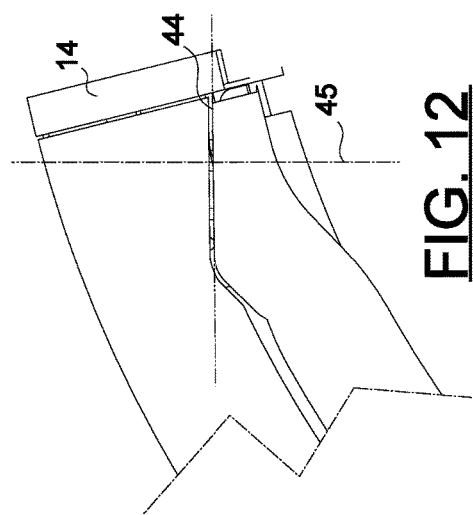
FIG. 12 is a diagrammatical view taken along line 12-12 of FIG. 1 of the upper fairing split.

As illustrated in FIGS. 12 and 13, upper and lower fairing splits 44 are disposed primarily perpendicular to the segment tilting axis 45 in order to prevent interference between them.

Having each VAFN mechanical actuator 26 and a position sensor combined in one integral unit anchored on the fixed torque box girder 13 and longitudinal beam 14, 15 simplifies installation and maintenance, reduces weight, and locates the actuator in a low vibration environment compared with anchoring it to the T/R sleeve.

Figure 27A:
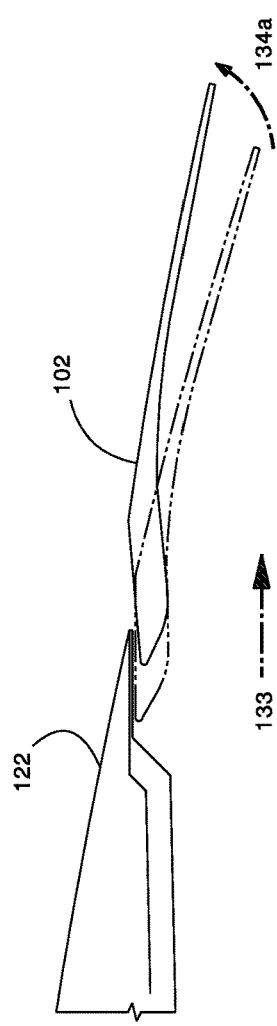
FIG. 27a is a diagrammatical view taken along line 27-27 of FIG. 25 of the movement of a VAFN segment having an outward tilt.
Figure 27B:
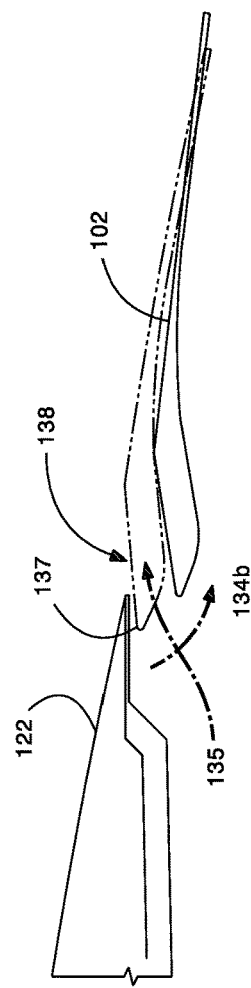
FIG. 27b is a diagrammatical view taken along line 27-27 of FIG. 25 of the movement of a VAFN segment having an inwardly tilting leading edge.
Figure 27C:
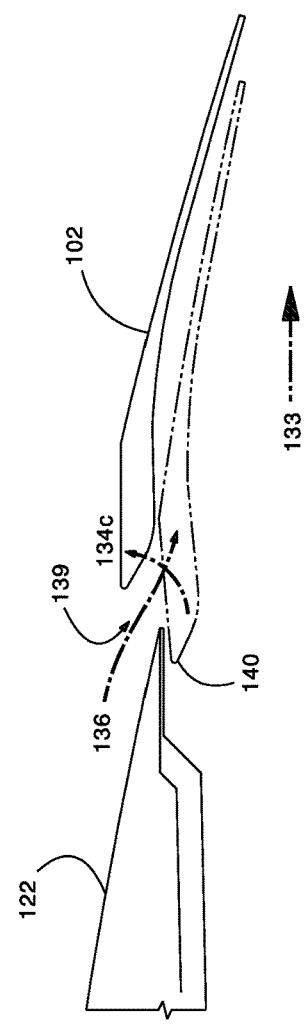
FIG. 27c is a diagrammatical view taken along line 27-27 of FIG. 25 of the movement of a VAFN segment having an outwardly tilting leading edge.

FIG. 27*a* shows the translating/and tilting motion 134*a* previously discussed to augment nozzle area. FIG. 27*b* shows an additional native capability of the trackway system to generate a flow adjusting bypass port between the T/R sleeve 122 and VAFN segment 102. The VAFN segment leading edge 137 translates radially inward while moving axially aftward 134*b* to open an annular gap forming an annular bypass port 138 and create a ramp shape when the VAFN segment is in an aft position. A portion 135 of fan duct airflow 133 is allowed to exit the fan duct upstream of the exit nozzle via the annular bypass port. This differs from Kohlenberg et al., U.S. Publication No. 20090053058 where the bypass port is generated by simply translating an airfoil surface aftward. Conversely, as shown in FIG. 27*c*, the translating and tilting motion can be utilized to create what is known as an ejector port 139. In this configuration the nozzle forward edge 140 translates radially outward and axially aft 134*c* to create an opening forming the flow adjusting ejector port between the T/R sleeve 122 and VAFN segment 102 where airflow around the nacelle outer surface is ingested into the fan duct 136 via ram pressure and suction when the VAFN is in an aft position.

Figure 17:
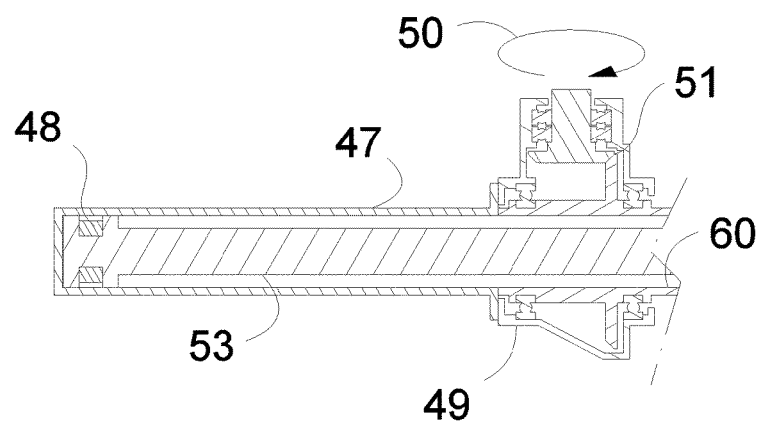
FIG. 17 is a cross-sectional view of the part of the actuator indicated by box 17 in FIG. 16 showing the position sensor and gearbox.

The VAFN actuator 26 is illustrated in greater detail in FIGS. 14-18. The actuator comprises a ballscrew/ballnut coupling also called a jackscrew. At the aft end 43 an eyelet is provided at the extremity of the translating arm for attachment to a bracket 59 on the VAFN segment 24. The front end of the main body 47 houses a linear variable differential transformer 48, as shown in FIG. 17, which senses the position of the associated VAFN segment, and generates the signal 29 sent to the control unit 30. Behind the sensor, a gearbox 49, which may be a variety of configurations, is attached to the torque box girder 13. The gearbox can accept the rotating force 50 of the motor 28 and apply it through gears 51 to an output shaft 60. The output shaft is slidingly and rotationally connected to a torque tube 52 by way of a sliding spline 61, or other equivalent means. The torque tube houses a ballnut 55 fixedly journalled into the torque tube which captures and extends a ballscrew 54. The ballscrew is linked to the pushing arm 56 of the actuator. The torque tube is slaved to the T/R sleeve by a gimbaled linkage 57 with sufficient degrees of freedom and clearance to the torque tube to accommodate relative motion between the actuator and translating sleeve. A bearing 58 secured to one of the beams 14, 15 and slidingly and rotatively connected to the torque tube holds the aft end of the actuator. The output shaft 60 houses a sensor shaft 53 connected to the ballscrew 54 for relaying the position of the VAFN segment via sensor element 62 to the linear variable differential transformer sensor 48.

Figure 18:
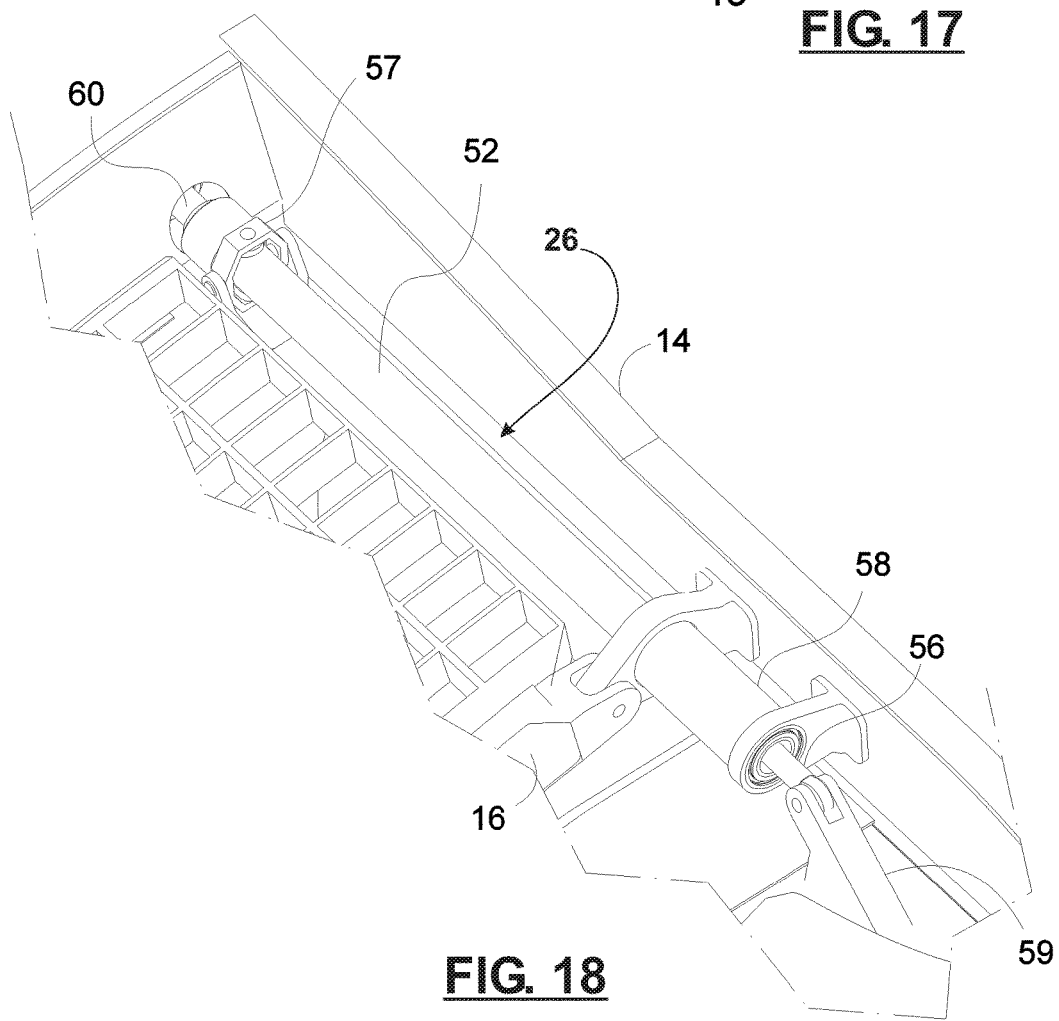
FIG. 18 is a perspective view of the actuator attachments.
Figure 19:
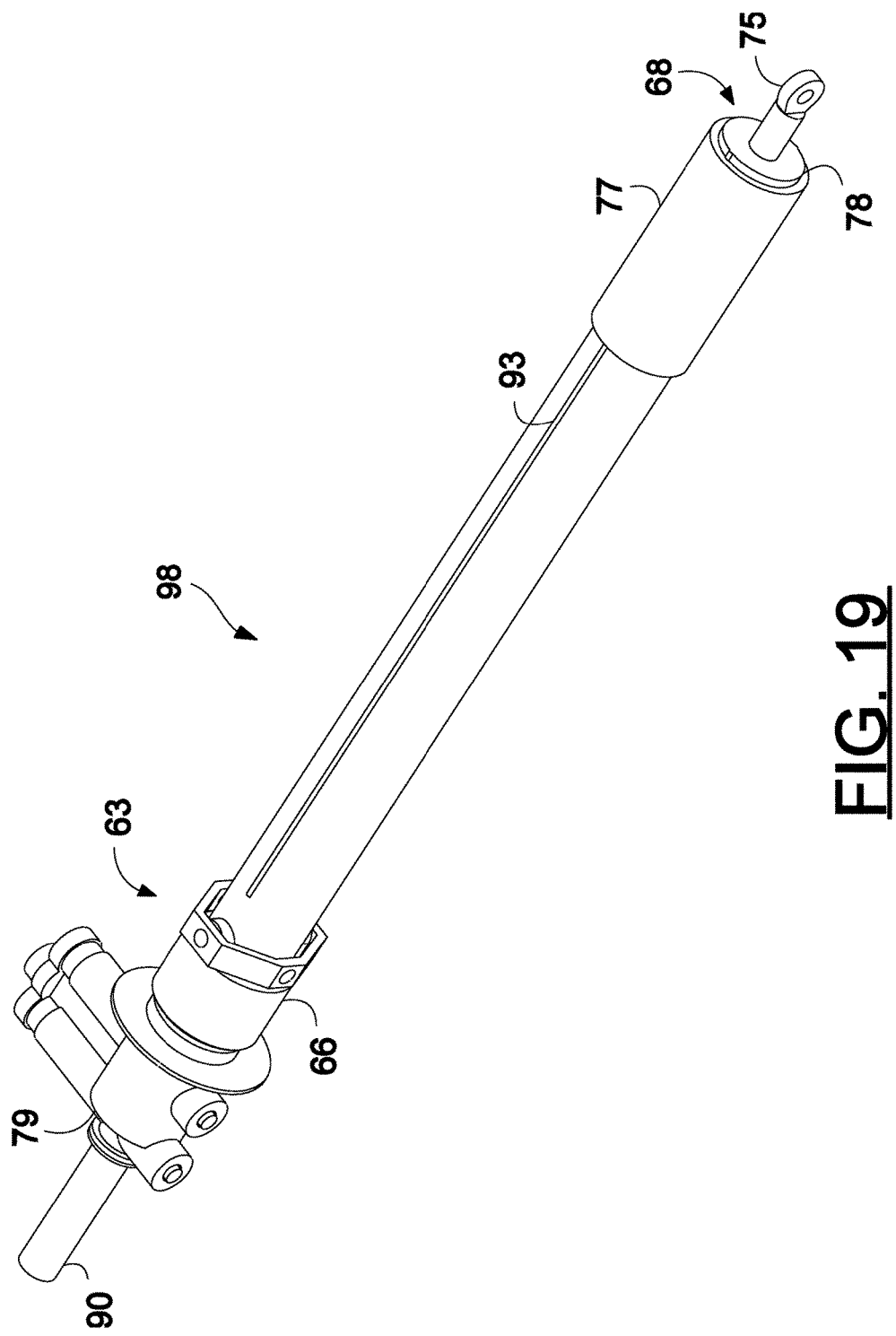
FIG. 19 is a perspective view of a dual actuator.
Figure 20:
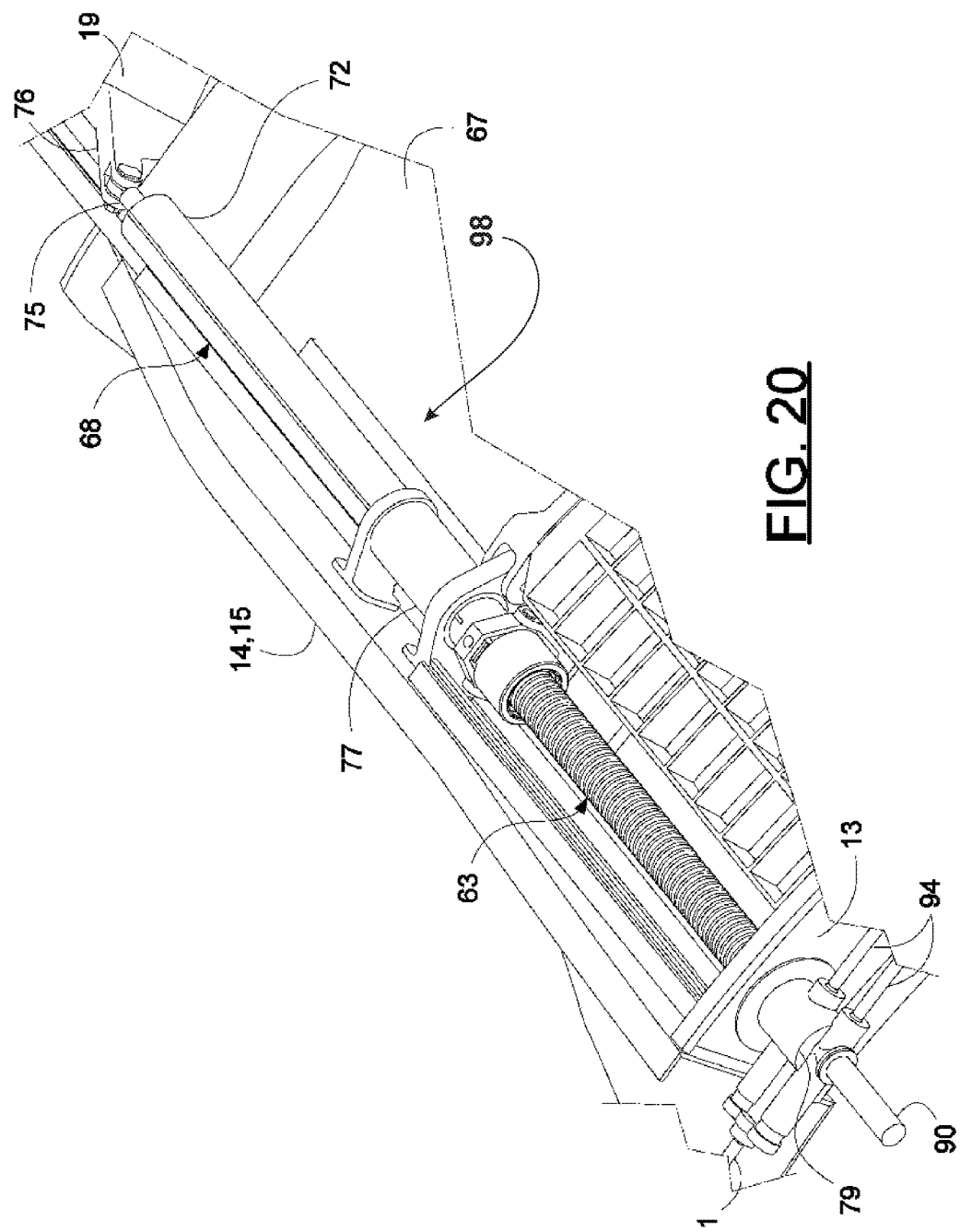
FIG. 20 is a perspective view of the dual actuator connected to a T/R sleeve and a VAFN segment showing the TR in the open position and the VAFN in the closed position.
Figure 21:
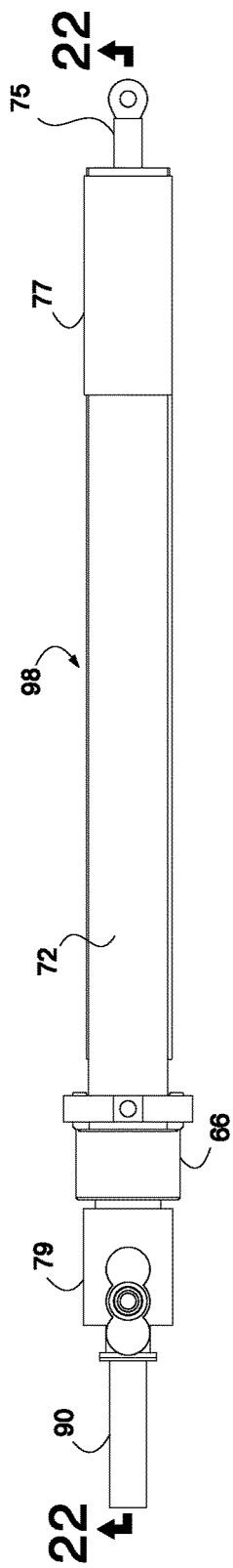
FIG. 21 is a side view of the dual actuator.

Given the fact that each VAFN actuator has two external thrust linkages as seen in FIG. 18; first by a pushing rod 56 to a bracket 59 connected to a VAFN segment, and second by a gimbaled linkage 57 to the T/R sleeve 22, it has two motions. First, it delivers the translating force to move the VAFN segment to any axial location within the range of the actuator in relation to the T/R sleeve. The second motion is the slidably-free ability to position the segment at any location within that range while being axially coupled to the moving T/R sleeve 22 allowing the two structures to move in unison under the sleeve actuation mechanism. Accordingly, the segment 24 can be axially translated independently of the sleeve 22 by its actuator 26, but the sleeve actuators 23 can also act on the segment.

Though the gimbaled linkage 57 is depicted in FIG. 15-16 as containing a pair of bearings in front and a gimbal in back, many equivalent configurations are possible that incorporate such components, such as thrust bearings, roller bearings, spherical bearings, spherical roller bearings or any combination thereof and other means known in the art. Similarly, though the gearbox 49 and aft support 58 are shown rigidly fixed to the torque box girder 13 and beams 14,15 respectively, these attachments may include components to allow supplemental degrees of freedom such as gimbals or other structures commonly known in the art to accommodate structural deflections.

The aft end configuration of the actuator translating arm link 43, 59 obviates the need for exaggerated fairings to house the VAFN actuation mechanism.

Compared with previous designs this actuator embodiment can be used as a midspan actuator away from the upper/lower fixed structure beams either as a center actuator in a group of 3 or as a dual actuator system with actuators co-located with the thrust reverser actuators thereby reducing obstruction of the thrust reverser cascade array.

The disadvantages mentioned earlier in the Background associated with prior art attempts to integrate the VAFN and T/R actuators in one unit can be largely overcome by the alternate design described below.

Referring now to FIGS. 19-24, there is illustrated combined dual actuators 98 adapted to control the translations of both the T/R sleeve and the VAFN. The T/R sleeve actuator 63 comprises a hollow first ballscrew, referred to as the T/R ballscrew 64 engaged by a first ballnut, referred to as the T/R ballnut 65 attached by a gimbaled linkage 66 to the T/R sleeve 67. While the gimbaled linkage 57 of the previously described embodiments was intended to transmit the movement supplied by the actuator of the T/R sleeve to the VAFN actuator assembly, the instant linkage transmits the translating movement of the T/R ballscrew 64 to the sleeve and synchronized movement to the VAFN.

The VAFN segment actuator 68 comprises a second ballscrew, referred to as the VAFN ballscrew 69 engaging a second ballnut, referred to as the VAFN ballnut 70 fixedly journalled into a torque tube 71 which is slidably and rotatively connected to the VAFN gearbox output shaft 96 by way of a sliding spline 97. The VAFN gearbox output shaft 96 is rotatively supported by bearings 100 to the gearbox 79 and to the T/R ballscrew 64.

The segment actuator further comprises a slide tube 72 which coaxially surrounds the first ballscrew, and the torque tube. The distal portion of the torque tube which fixedly mounts the second ballnut is supported within the slide tube by bearings 73. The bearings allow rotation of the torque tube within the rotationally fixed slide tube which is fixedly linked to the first non-rotating ballnut in order to accommodate the VAFN segment following the translating movement of the sleeve actuator. A key 93 running along the slide tube attaches the rotation of the slide tube to the first ball nut 65 in order to generate axial motion when the slide tube and first ballnut are acted upon by the first ballscrew 64.

The VAFN ballscrew 69 driven by the rotation of the torque tube 71 and second ballnut 70 extends into the distal section 74 of the slide tube and is linked to a pushing arm 75 which connects to a bracket 76 mounted on the VAFN segment 19. The distal section of the slide tube is supported by a bearing 77 secured to one of the longitudinal beams 14, 15.

Accordingly, the translation of the T/R sleeve results from the rotation of the first ballscrew 64, and the movement of the VAFN segment follows the rotation of the VAFN ballnut 70 in conjunction with or independently from the first ballscrew 64. These rotational movements are driven and controlled by a gearbox 79 secured to the torque box girder 13, a stationary structure with respect to the assembly, at the proximal end of the actuator. As described in the previous embodiments, though the gearbox 79 and bearing 77 are shown rigidly fixed to the structure, these attachments may contain components commonly known in the art to allow supplemental degrees of freedom.

Figure 22:
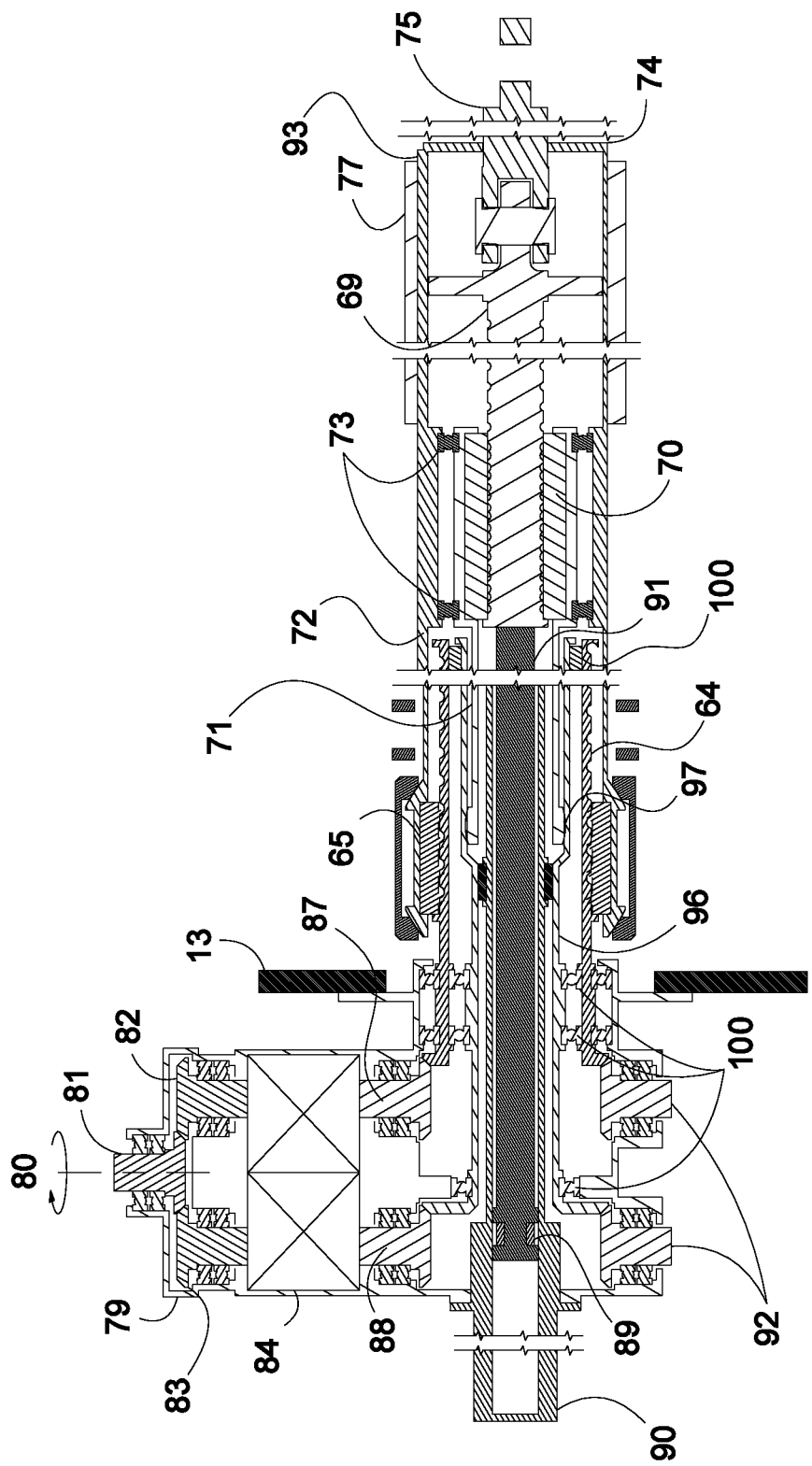
FIG. 22 is a cross-sectional view taken along line 17-17 of FIG. 21.
Figure 23:
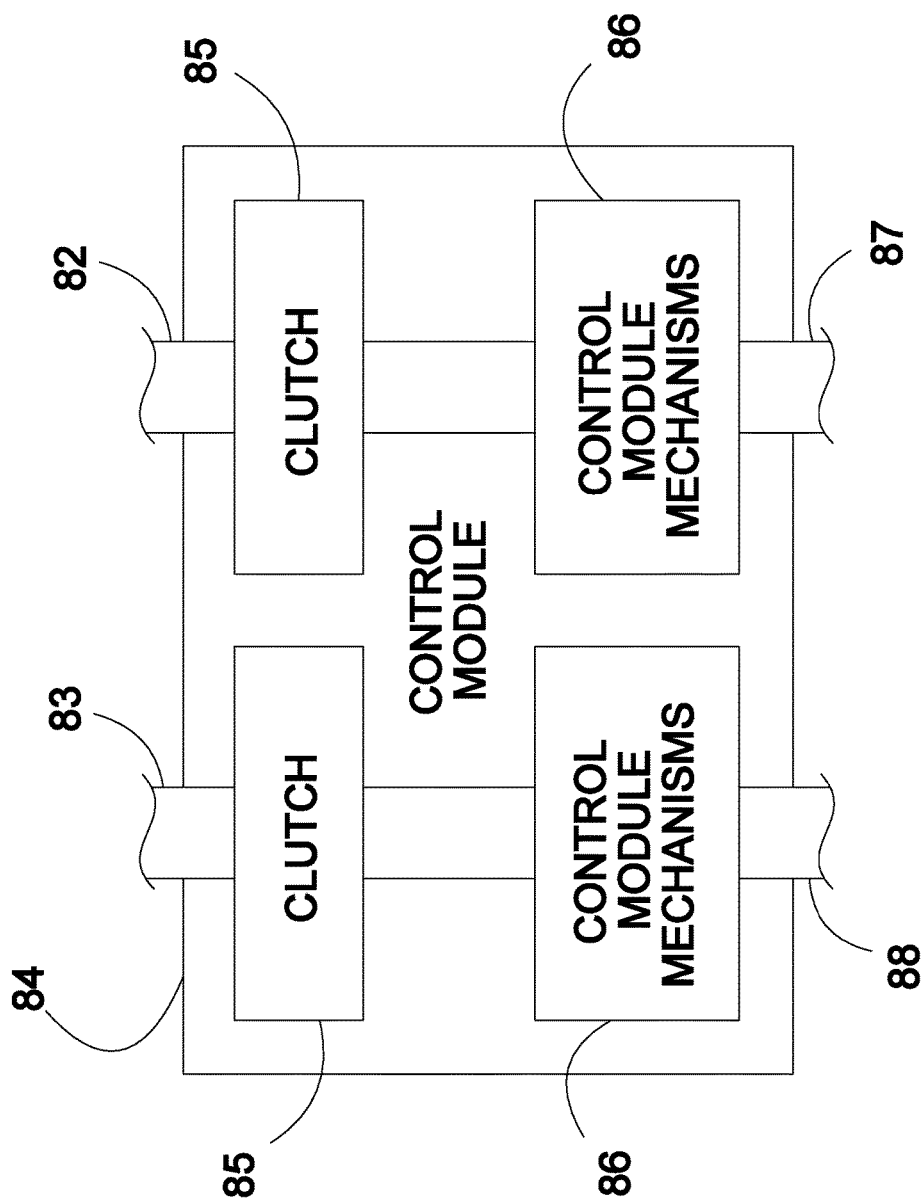
FIG. 23 is diagram of the torque control and switching module.

As shown in FIGS. 22 and 23, the gearbox accept a rotational force from a motor 80 on its input shaft 81 and transmits the rotation to a T/R shaft 82 and to a VAFN shaft 83. These shafts penetrate a torque control and switching module 84 that contains clutches 85, and various mechanisms 86, that may include locking mechanisms, lock sensors, load/torque limiters, anti-backdrive devices, manual drive units, rotation sensors, and other sensing and conditioning mechanisms common in the art. A T/R output shaft 87 is geared to the first ballscrew 64, and a VAFN output shaft 88 is geared to the VAFN output shaft 96. As in the previously described embodiments, a linear variable differential transformer 90 can sense the axial position of the VAFN via a sensor element 89 mounted upon the proximal end of a sensing shaft 91 connected to the back of the second ballscrew 69.

Torque output shafts 92 are provided out of the gearbox to drive auxiliary independent or combined T/R and VAFN actuators operating on other parts of the T/R and VAFN via flexshafts. The output shafts and flexshafts are thus synchronized to the movements of the T/R output shaft 87 VAFN output shaft 88.

Figure 24:
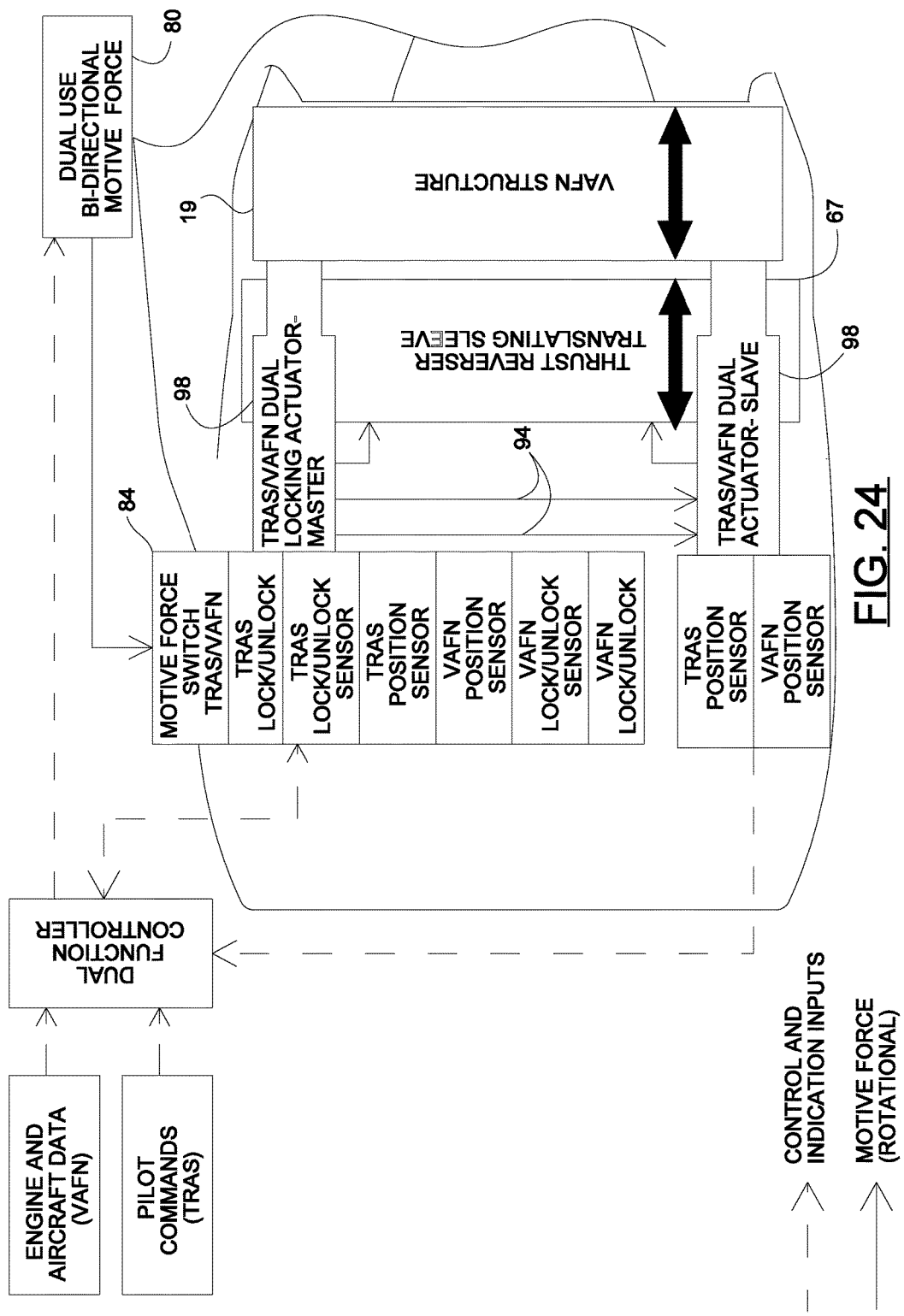
FIG. 24 is a diagram of the T/R sleeve and VAFN segment control and actuation system.

FIG. 24 illustrates the overall operating system for the T/R sleeve and of the VAFN. The master actuator control unit 84 incorporates a plurality of drivers and sensors used in managing the operation of both the T/R actuation system (TRAS) and the VAFN actuation system. Each respective TRAS and VAFN actuation system lock/unlock supplies positive locking to their respective system when the motive force is not provided by the drive system or in case of failure of the input torque transmission flexshaft. As illustrated in FIG. 24, if the output flexshaft fails, the system will result in a top/bottom skew of the VAFN segment due to aerodynamic loads and because the slave actuator lacks a controlled locking mechanism. This skew may be mitigated by adding another locking mechanism into the slave actuator. The TRAS and VAFN lock/unlock sensors provide an indication to the controller that the T/R sleeve lock or the VAFN lock is engaged. The TRAS and VAFN position sensors relay the positions of the sleeve and segment and compare the output from all actuators to ensure that no skew condition exists. The motive force switch comprises an electromechanical device that shuttles motive force from the dual use input 81 between the TRAS and VAFN drive channels.

Figure 25:
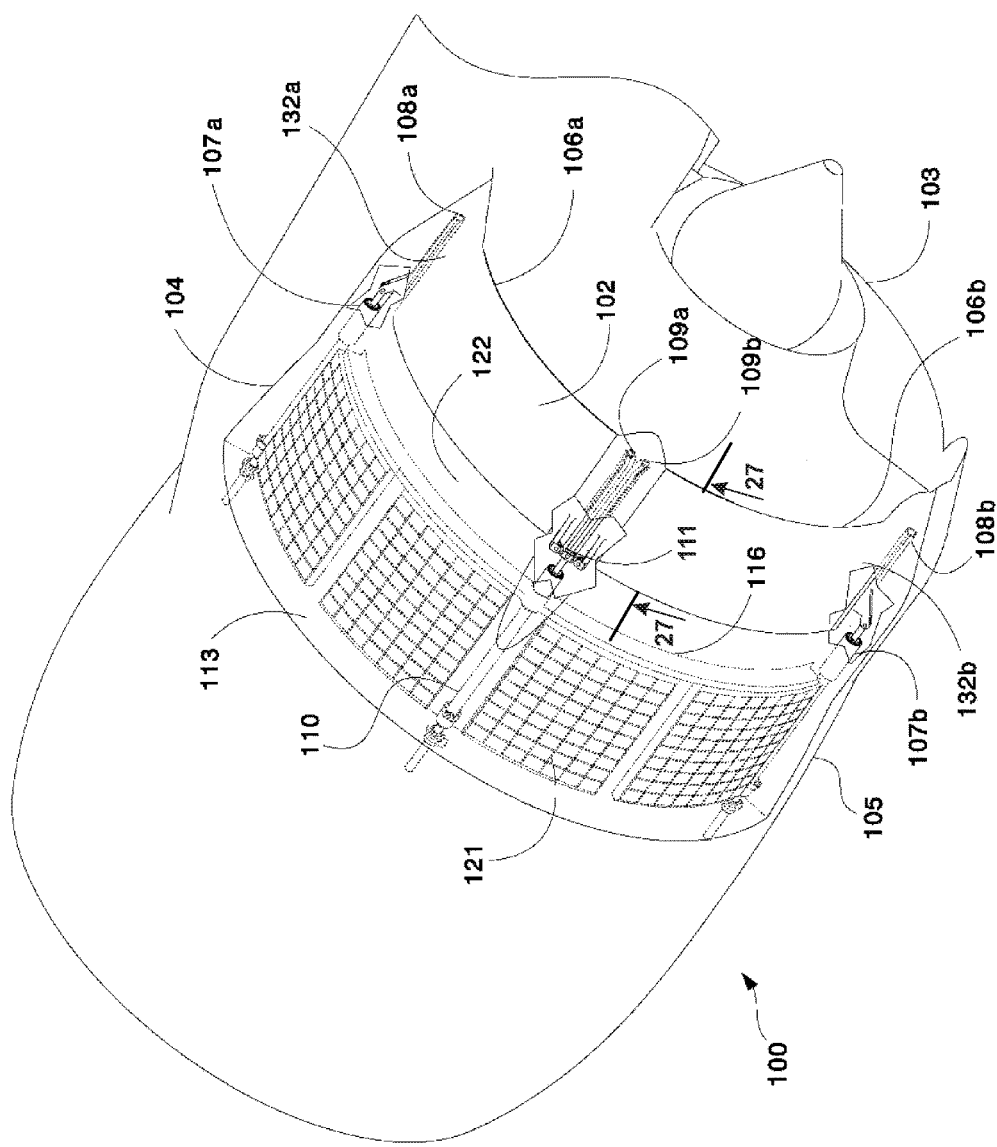
FIG. 25 is a perspective view of a nacelle housing an aircraft gas turbine engine including an actuator for translating and tilting a pair of angularly adjacent fan nozzle segments.
Figure 26:
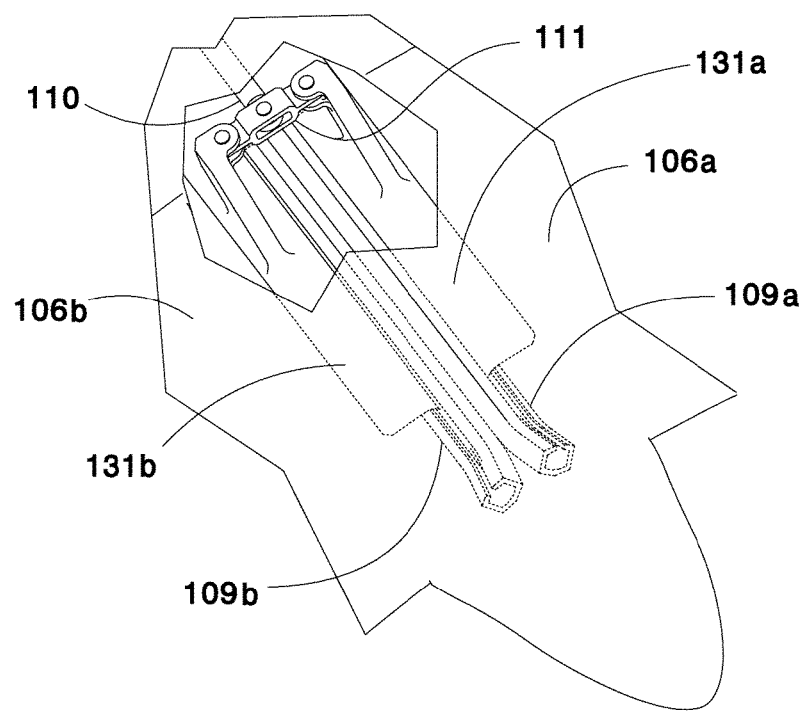
FIG. 26 is a partial perspective view of a structure mechanically linking an actuator shaft to a pair of angularly adjacent fan nozzle segments.

Referring now to FIGS. 25-26 there is illustrated an alternate embodiment of a nacelle assembly 100 having a T/R cascade array 121 covered and uncovered by an axially translating sleeve 122 moved by a number of actuators 107a,107b,110. Abaft of the sleeve is a variable area fan nozzle (VAFN) divided into a left half portion 102 and symmetric right half portion 103 by stationary upper and lower beams 104,105.

Referring now to portion 102, each VAFN half portion has two or more frusto-conical segments 106a,106b that can be axially translated and radially tilted to increase or decrease the fan exhaust area. The nozzle sections are moved by the actuators 107a,107b,110 which are mechanically linked to the nozzle sections by mechanical linking structures 111. Each VAFN half portion has its circumferential edges 132a, 132b pivotingly connected to a pair of axially spaced-apart double-roller carriages (not shown) which are captured by and run along trackways 108a,108b which are attached to the translating sleeve 122 near sliders which slidingly connect the sleeve to the stationary beams 104,105. This mechanical linking structure operates similarly to the embodiments shown in FIGS. 4 and 5.

Supplemental trackways 109a,109b attached to the T/R sleeve 122 slidingly capture spaced apart roller carriages pivotingly connected to pins attached to the circumferential edges 131a,131b of an angularly adjacent pair of segments 106a,106b forming a linking structure to enable the axial translating and radial tilting motion of each VAFN segment.

Similarly to the previous embodiments it should be noted that the VAFN actuators are mounted to a stationary structure, namely the torque box girder 113, crosstie ring 116 and/or the longitudinal beams 104,105 depending on their location around the circumference of the nacelle. A supplemental actuator 110 or actuators may be placed circumferentially between nozzle segments 106a,106b such that the actuator coincidentally drives both adjacent nozzle segments via a common mechanical linkage 111. It shall be understood that those actuators requiring a mechanical link to the T/R can be of the dual concentric actuator type shown in FIGS. 19-24.

While the preferred embodiment has been described and alternate arrangements have been suggested, other embodiments and modification may be devised without departing from the spirit of the invention and the scope of the appended claims.

What is claimed is:

1. In an aircraft gas turbine nacelle assembly having a fore-and-aft central axis, a stationary structure, including an annular torque box girder, at least two longitudinal beams and a transversal crosstie ring, said aircraft gas turbine nacelle assembly further including a thrust reverser cascade array between said annular torque box girder and said transversal crosstie ring, a movable sleeve having axial sliders shaped and dimensioned to translate said movable sleeve across and close said thrust reverser cascade array, and a plurality of movable fan nozzle segments abaft said movable sleeve, an improvement which comprises:

an angularly adjacent pair of said plurality of movable fan nozzle segments abaft said transversal crosstie ring;

wherein said angularly adjacent pair of said plurality of movable fan nozzle segments are slidingly and tiltingly driven with respect to said stationary structure by at least one actuator;

said at least one actuator being mechanically linked to a first one of said angularly adjacent pair of said plurality of movable fan nozzle segments; and said at least one actuator being mechanically linked to a second one of said angularly adjacent pair of said plurality of movable fan nozzle segments;

a first linking structure connected to said first one of said angularly adjacent pair of said plurality of movable fan nozzle segments, said first linking structure comprising:

a first non-linear guiding trackway having a first outwardly curving section bent to induce said first one of said angularly adjacent pair of said plurality of movable fan nozzle segments into a tilting movement in reference to said first non-linear guiding trackway; and,
a first at least two spaced apart carriages connected to said first one of said angularly adjacent pair of said plurality of movable fan nozzle segments, and riding in said first non-linear guiding trackway;
a second linking structure connected to said a second one of said angularly adjacent pair of said plurality of movable fan nozzle segments, said second linking structure comprising:
a second non-linear guiding trackway having a second outwardly curving section bent to induce said second one of said angularly adjacent pair of said plurality of movable fan nozzle segments into a tilting movement in reference to said second non-linear guiding trackway; and,
a second at least two spaced apart carriages connected to said second one of said angularly adjacent pair of said plurality of movable fan nozzle segments, and riding in said second non-linear guiding trackway.

2. The improvement of claim 1, wherein said first one of said angularly adjacent pair of said plurality of movable fan nozzle segments is rotatively connected to each of said first at least two spaced apart carriages about at least one axis substantially normal to said fore-and-aft central axis.

3. The improvement of claim 1, wherein said first non-linear guiding trackway is attached to said movable sleeve.

4. The improvement of claim 1, wherein:
said at least one actuator comprises a body anchored to said annular torque box girder and an extensible arm connected to said movable sleeve.

5. The improvement of claim 1, wherein a flow adjusting port is created between a leading edge of at least one of said angularly adjacent pair of said plurality of movable fan nozzle segments and said movable sleeve when said at least one of said angularly adjacent pair of said plurality of movable fan nozzle segments is driven to an aft position.

6. The improvement of claim 5, wherein said flow adjusting port is selected from the group consisting of a bypass port and an ejector port.

7. The improvement of claim 1, which further comprises a position sensor integrated within said at least one actuator.

8. The improvement of claim 7, wherein said position sensor comprises a linear variable differential transformer.

9. The improvement of claim 1, wherein said at least one actuator comprises a ballscrew and ballnut coupling.

10. The improvement of claim 1, wherein said at least one actuator comprises coaxially mounted components in an actuation assembly anchored to said stationary structure.

11. The improvement of claim 10, wherein said actuation assembly is fixedly attached to said annular torque box girder and to one of said at least two longitudinal beams.

12. The improvement of claim 10, wherein said actuation assembly comprises:
a translatable first ballnut attached to said movable sleeve; and,
a non-translatable tubular first ballscrew engaging said translatable first ballnut.

13. The improvement of claim 12, wherein said actuation assembly further comprises:
a translatable second ballnut;
a torque tube coaxially mounted within said non-translatable tubular first ballscrew and secured to said translatable second ballnut; and,
a translatable second ballscrew engaging said translatable second ballnut and having a distal end attached to said first one of said angularly adjacent pair of said plurality of movable fan nozzle segments.

14. The improvement of claim 13, which further comprises a gear box including:
a rotatable input shaft;
a first output shaft rotatively driving said non-translatable tubular first ballscrew; and,
a second output shaft rotatively driving said torque tube.

15. The improvement of claim 14, wherein said gear box comprises:
a clutch mechanism and a rotation reverser mechanism between said rotatable input shaft and each of said first and second output shafts.

16. The improvement of claim 12, wherein said actuation assembly further comprises:
a slide tube coaxially surrounding said non-translatable tubular first ballscrew; and,
a bearing attached to one of said at least two longitudinal beams and slidingly supporting said slide tube.

17. The improvement of claim 16, wherein said actuation assembly further comprises:
an arm extending axially from said translatable second ballscrew distally outside said bearing; and
a bracket connecting said arm to said first one of said angularly adjacent pair of said plurality of movable fan nozzle segments.

18. An aircraft gas turbine nacelle assembly having a fore-and-aft central axis and comprising:
a stationary structure including an annular torque box girder, a transversal crosstie ring and at least two longitudinal beams;
a plurality of movable fan nozzle segments abaft said transversal crosstie ring;
wherein an adjacent pair of said plurality of movable fan nozzle segments are slidingly and tiltingly driven with respect to said stationary structure by at least one actuator;
said at least one actuator being mechanically linked to a first one of said adjacent pair of said plurality of movable fan nozzle segments; and said at least one actuator being mechanically linked to a second one of said adjacent pair of said plurality of movable fan nozzle segments;
a first linking structure connected to said first one of said angularly adjacent pair of said plurality of movable fan nozzle segments, said first linking structure comprising:
a first non-linear guiding trackway having a first outwardly curving section bent to induce said first one of said angularly adjacent pair of said plurality of movable fan nozzle segments into a tilting movement in reference to said first non-linear guiding trackway; and,
a first at least two spaced apart carriages connected to said first one of said angularly adjacent pair of said plurality of movable fan nozzle segments, and riding in said first non-linear guiding trackway;
a second linking structure connected to said a second one of said angularly adjacent pair of said plurality of movable fan nozzle segments, said second linking structure comprising:
a second non-linear guiding trackway having a second outwardly curving section bent to induce said second one of said angularly adjacent pair of said plurality of movable fan nozzle segments into a tilting movement in reference to said second non-linear guiding trackway; and, a second at least two spaced apart carriages connected to said second one of said angularly adjacent pair of said plurality of movable fan nozzle segments, and riding in said second non-linear guiding trackway.

19. The aircraft gas turbine nacelle assembly of claim 18, wherein a flow adjusting port is created between a leading edge of at least one of said adjacent pair of said plurality of movable fan nozzle segments and said stationary structure when said at least one of said adjacent pair of said plurality of movable fan nozzle segments is driven to an aft position.

20. The aircraft gas turbine nacelle assembly of claim 19, wherein said flow adjusting port is selected from the group consisting of a bypass port and an ejector port.

21. The aircraft gas turbine nacelle assembly of claim 19, wherein said at least one actuator comprises:

a linkage to said movable sleeve, said linkage having sufficient degrees of freedom and clearance to allow relative motion between said at least one actuator and said movable sleeve.

22. The aircraft gas turbine nacelle assembly of claim 19, wherein said at least one actuator comprises a segment position sensor.

23. The aircraft gas turbine nacelle assembly of claim 22, wherein said segment position sensor comprises a linear variable differential transformer integral with said at least one actuator.

24. The aircraft gas turbine nacelle assembly of claim 18, wherein said at least one actuator is a dual actuator which comprises:

a first extremity anchored to said annular torque box girder and a second extremity anchored to said movable sleeve;

whereby said movable sleeve can be actuated independently from said adjacent pair of said plurality of movable fan nozzle segments.

25. The aircraft gas turbine nacelle assembly of claim 24, wherein said dual actuator further comprises:

a jackscrew extender having an axially translatable shaft and a linkage between said shaft and said adjacent pair of said plurality of movable fan nozzle segments; whereby said adjacent pair of said plurality of movable fan nozzle segments can be axially translated along with said movable sleeve.

26. The aircraft gas turbine nacelle assembly of claim 18, wherein said at least one actuator comprises an attachment to one of said at least two longitudinal beams.

27. The aircraft gas turbine nacelle assembly of claim 18, which further comprises a gimbaled link between said movable sleeve and said at least one actuator.

* * * * *